(12) United States Patent
Maskatia et al.

(10) Patent No.: US 9,615,134 B2
(45) Date of Patent: *Apr. 4, 2017

(54) SYSTEM AND METHOD FOR APPLYING PARENTAL CONTROL LIMITS FROM CONTENT PROVIDERS TO MEDIA CONTENT

(71) Applicant: Redbox Automated Retail, LLC, Oakbrook Terrace, IL (US)

(72) Inventors: Imran Maskatia, Milpitas, CA (US); Jason Rubinstein, Lake Forest, IL (US)

(73) Assignee: REDBOX AUTOMATED RETAIL, LLC, Oakbrook Terrace, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/069,727

(22) Filed: Mar. 14, 2016

(65) Prior Publication Data

US 2016/0269778 A1    Sep. 15, 2016

Related U.S. Application Data

(63) Continuation of application No. 13/567,948, filed on Aug. 6, 2012, now Pat. No. 9,286,617.
(Continued)

(51) Int. Cl.
*H04N 7/16* (2011.01)
*H04N 21/454* (2011.01)
(Continued)

(52) U.S. Cl.
CPC ......... *H04N 21/454* (2013.01); *G06Q 30/02* (2013.01); *G07F 17/005* (2013.01); *G07F 17/16* (2013.01);
(Continued)

(58) Field of Classification Search
CPC ........... H04N 21/25875; H04N 21/454; H04N 21/25891; H04N 21/4532
(Continued)

(56) References Cited

U.S. PATENT DOCUMENTS

| | | | |
|---|---|---|---|
| 1,901,243 A | 3/1933 | Horwitt | |
| 2,098,697 A | 11/1937 | Vanderput | |

(Continued)

FOREIGN PATENT DOCUMENTS

| | | | |
|---|---|---|---|
| CA | 1236546 A1 | 5/1988 | |
| CA | 2302753 A1 | 5/1999 | |

(Continued)

OTHER PUBLICATIONS

International Search Report for Application No. PCT/US06/15133, mailed on Jun. 6, 2007, 1 page.
(Continued)

*Primary Examiner* — Nnenna Ekpo
(74) *Attorney, Agent, or Firm* — James P. Muraff; Neal, Gerber & Eisenberg LLP

(57) ABSTRACT

System and Method of filtering and modifying access to media content based on parental control limits are provided. The method for filtering media content includes receiving authentication information for a content provider, authenticating to the content provider, importing parental control limits from the content provider, storing the received parental control limits in a customer profile, and filtering the media content based on the parental control limits to produce a filtered list of the media content. The method for modifying access to media content includes authenticating to a customer profile with a unique customer identifier, retrieving parental control limits from the customer profile, and modifying access to the media content based on the retrieved parental control limits. Changes in the parental
(Continued)

control limits at a content provider may be detected and updated in the customer profile.

16 Claims, 12 Drawing Sheets

Related U.S. Application Data

(60) Provisional application No. 61/523,257, filed on Aug. 12, 2011.

(51) Int. Cl.
  *G06Q 30/02* (2012.01)
  *H04N 21/258* (2011.01)
  *H04N 21/45* (2011.01)
  *G07F 17/00* (2006.01)
  *G07F 17/16* (2006.01)
  *H04N 21/6547* (2011.01)

(52) U.S. Cl.
  CPC . *H04N 21/25875* (2013.01); *H04N 21/25891* (2013.01); *H04N 21/4532* (2013.01); *H04N 21/6547* (2013.01)

(58) Field of Classification Search
  USPC .......................... 725/27, 28, 29, 30
  See application file for complete search history.

(56) References Cited

U.S. PATENT DOCUMENTS

| | | |
|---|---|---|
| 2,549,624 A | 4/1951 | Moore |
| 2,559,599 A | 7/1951 | Crump et al. |
| 2,562,293 A | 7/1951 | Bourquin |
| 3,267,436 A | 8/1966 | Alpert et al. |
| 3,379,295 A | 4/1968 | Varley |
| 3,404,764 A | 10/1968 | Lipp et al. |
| 3,529,155 A | 9/1970 | Hansen |
| 3,622,995 A | 11/1971 | Dilks et al. |
| 3,648,241 A | 3/1972 | Naito et al. |
| 3,824,544 A | 7/1974 | Simijian |
| 3,826,344 A | 7/1974 | Wahlberg |
| 3,831,807 A | 8/1974 | Deaton et al. |
| 3,946,220 A | 3/1976 | Brobeck et al. |
| 3,964,577 A | 6/1976 | Bengtsson |
| 4,043,483 A | 8/1977 | Gore et al. |
| 4,073,368 A | 2/1978 | Mustapick |
| 4,300,040 A | 11/1981 | Gould et al. |
| 4,306,219 A | 12/1981 | Main et al. |
| 4,348,551 A | 9/1982 | Nakatani et al. |
| 4,369,422 A | 1/1983 | Rasmussen et al. |
| 4,369,442 A | 1/1983 | Werth et al. |
| 4,385,366 A | 5/1983 | Housey, Jr. |
| 4,388,689 A | 6/1983 | Hayman et al. |
| 4,396,985 A | 8/1983 | Ohara |
| 4,414,467 A | 11/1983 | Gould et al. |
| 4,415,065 A | 11/1983 | Sandstedt |
| 4,449,186 A | 5/1984 | Kelly et al. |
| 4,458,802 A | 7/1984 | MacIver et al. |
| 4,519,522 A | 5/1985 | McElwee |
| 4,530,067 A | 7/1985 | Dorr |
| 4,547,851 A | 10/1985 | Kurland |
| 4,553,222 A | 11/1985 | Kurland et al. |
| 4,567,359 A | 1/1986 | Lockwood |
| 4,569,421 A | 2/1986 | Sandstedt |
| RE32,115 E | 4/1986 | Lockwood et al. |
| 4,598,810 A | 7/1986 | Shore et al. |
| 4,649,481 A | 3/1987 | Takahashi |
| 4,650,977 A | 3/1987 | Couch |
| 4,668,150 A | 5/1987 | Blumberg |
| 4,669,596 A | 6/1987 | Capers et al. |
| 4,675,515 A | 6/1987 | Lucero |
| 4,706,794 A | 11/1987 | Awane et al. |
| 4,722,053 A | 1/1988 | Dubno et al. |
| 4,723,212 A | 2/1988 | Mindrum et al. |
| 4,734,005 A | 3/1988 | Blumberg |
| 4,766,548 A | 8/1988 | Cedrone et al. |
| 4,767,917 A | 8/1988 | Ushikubo |
| 4,775,935 A | 10/1988 | Yourick |
| 4,778,983 A | 10/1988 | Ushikubo |
| 4,789,045 A | 12/1988 | Pugh |
| 4,789,054 A | 12/1988 | Shore et al. |
| 4,797,818 A | 1/1989 | Cotter |
| 4,812,629 A | 3/1989 | O'Neil et al. |
| 4,812,985 A | 3/1989 | Hambrick et al. |
| 4,814,592 A | 3/1989 | Bradt et al. |
| 4,814,985 A | 3/1989 | Swistak |
| 4,821,629 A | 4/1989 | Davison et al. |
| 4,821,917 A | 4/1989 | Brown |
| 4,825,045 A | 4/1989 | Humble |
| 4,839,505 A | 6/1989 | Bradt et al. |
| 4,839,507 A | 6/1989 | May |
| 4,847,764 A | 7/1989 | Halvorson |
| 4,858,743 A | 8/1989 | Paraskevakos et al. |
| 4,860,876 A | 8/1989 | Moore et al. |
| 4,866,661 A | 9/1989 | De Prins |
| 4,875,598 A | 10/1989 | Dahl |
| 4,882,475 A | 11/1989 | Miller et al. |
| 4,893,705 A | 1/1990 | Brown |
| 4,893,727 A | 1/1990 | Near |
| 4,896,024 A | 1/1990 | Morello et al. |
| 4,903,815 A | 2/1990 | Hirschfeld et al. |
| 4,915,205 A | 4/1990 | Reid et al. |
| D308,052 S | 5/1990 | Darden et al. |
| 4,921,128 A | 5/1990 | Guigan et al. |
| 4,941,841 A | 7/1990 | Darden et al. |
| 4,945,428 A | 7/1990 | Waldo |
| 4,947,028 A | 8/1990 | Gorog |
| 4,959,686 A | 9/1990 | Spallone et al. |
| 4,967,403 A | 10/1990 | Ogawa et al. |
| 4,967,906 A | 11/1990 | Morello et al. |
| 4,982,346 A | 1/1991 | Girouard et al. |
| 4,991,739 A | 2/1991 | Levasseur |
| 4,995,498 A | 2/1991 | Menke |
| 5,007,518 A | 4/1991 | Crooks et al. |
| 5,012,077 A | 4/1991 | Takano |
| 5,013,897 A | 5/1991 | Harman et al. |
| 5,019,699 A | 5/1991 | Koenck |
| 5,020,958 A | 6/1991 | Tuttobene |
| 5,028,766 A | 7/1991 | Shah |
| 5,042,686 A | 8/1991 | Stucki |
| 5,077,462 A | 12/1991 | Newell et al. |
| 5,077,607 A | 12/1991 | Johnson et al. |
| 5,085,308 A | 2/1992 | Wilhelm |
| 5,088,586 A | 2/1992 | Isobe et al. |
| 5,091,713 A | 2/1992 | Horne et al. |
| 5,095,195 A | 3/1992 | Harman et al. |
| 5,105,069 A | 4/1992 | Hakenewerth et al. |
| 5,128,862 A | 7/1992 | Mueller |
| 5,133,441 A | 7/1992 | Brown |
| 5,139,384 A | 8/1992 | Tuttobene |
| 5,143,193 A | 9/1992 | Geraci |
| 5,159,560 A | 10/1992 | Newell et al. |
| 5,205,436 A | 4/1993 | Savage |
| 5,206,814 A | 4/1993 | Cahlander et al. |
| 5,207,784 A | 5/1993 | Schwartzendruber |
| 5,212,649 A | 5/1993 | Pelletier et al. |
| 5,226,519 A | 7/1993 | DeWoolfson |
| 5,235,509 A | 8/1993 | Mueller et al. |
| RE34,369 E | 9/1993 | Darden et al. |
| 5,273,183 A | 12/1993 | Tuttobene |
| 5,313,392 A | 5/1994 | Temma et al. |
| 5,313,393 A | 5/1994 | Varley et al. |
| 5,319,705 A | 6/1994 | Halter et al. |
| 5,323,327 A | 6/1994 | Carmichael et al. |
| 5,353,219 A | 10/1994 | Mueller et al. |
| 5,383,111 A | 1/1995 | Homma et al. |
| 5,385,265 A | 1/1995 | Schlamp |
| 5,402,911 A | 4/1995 | Noell |
| 5,408,417 A | 4/1995 | Wilder |
| 5,409,092 A | 4/1995 | Itako et al. |
| 5,418,713 A | 5/1995 | Allen |
| 5,442,568 A | 8/1995 | Ostendorf et al. |

(56) References Cited

U.S. PATENT DOCUMENTS

| | | |
|---|---|---|
| 5,445,295 A | 8/1995 | Brown |
| 5,450,584 A | 9/1995 | Sekiguchi et al. |
| 5,450,938 A | 9/1995 | Rademacher |
| 5,467,892 A | 11/1995 | Schlamp |
| 5,482,139 A | 1/1996 | Rivalto |
| 5,484,988 A | 1/1996 | Hills et al. |
| 5,499,707 A | 3/1996 | Steury |
| 5,504,675 A | 4/1996 | Cragun et al. |
| 5,510,979 A | 4/1996 | Moderi et al. |
| 5,513,116 A | 4/1996 | Buckley et al. |
| 5,546,316 A | 8/1996 | Buckley et al. |
| 5,550,746 A | 8/1996 | Jacobs |
| 5,555,143 A | 9/1996 | Hinnen et al. |
| 5,559,714 A | 9/1996 | Banks et al. |
| 5,559,887 A | 9/1996 | Davis et al. |
| 5,561,604 A | 10/1996 | Buckley et al. |
| 5,576,951 A | 11/1996 | Lockwood |
| 5,594,791 A | 1/1997 | Szlam et al. |
| 5,608,643 A | 3/1997 | Wichter et al. |
| 5,615,123 A | 3/1997 | Davidson et al. |
| 5,632,681 A | 5/1997 | Bakoglu et al. |
| 5,633,839 A | 5/1997 | Alexander et al. |
| 5,637,845 A | 6/1997 | Kolls |
| 5,638,985 A | 6/1997 | Fitzgerald et al. |
| 5,644,727 A | 7/1997 | Atkins |
| 5,647,505 A | 7/1997 | Scott |
| 5,647,507 A | 7/1997 | Kasper |
| 5,682,276 A | 10/1997 | Hinnen et al. |
| 5,694,546 A | 12/1997 | Reisman |
| 5,699,262 A | 12/1997 | Lang et al. |
| 5,699,528 A | 12/1997 | Hogan |
| 5,715,403 A | 2/1998 | Stefik et al. |
| 5,724,069 A | 3/1998 | Chen |
| 5,724,521 A | 3/1998 | Dedrick |
| 5,732,398 A | 3/1998 | Tagawa |
| 5,734,150 A | 3/1998 | Brown et al. |
| 5,748,485 A | 5/1998 | Christiansen et al. |
| 5,754,850 A | 5/1998 | Janssen |
| 5,761,071 A | 6/1998 | Bernstein et al. |
| 5,765,142 A | 6/1998 | Allred et al. |
| 5,768,142 A | 6/1998 | Jacobs |
| 5,769,269 A | 6/1998 | Peters |
| 5,777,884 A | 7/1998 | Belka et al. |
| H1743 H | 8/1998 | Graves et al. |
| 5,790,677 A | 8/1998 | Fox et al. |
| 5,806,071 A | 9/1998 | Balderrama et al. |
| 5,822,216 A | 10/1998 | Satchell, Jr. et al. |
| 5,822,291 A | 10/1998 | Brindze et al. |
| 5,831,862 A | 11/1998 | Hetrick et al. |
| 5,832,503 A | 11/1998 | Malik et al. |
| 5,850,442 A | 12/1998 | Muftic |
| 5,870,716 A | 2/1999 | Sugiyama et al. |
| 5,873,069 A | 2/1999 | Reuhl et al. |
| 5,875,110 A | 2/1999 | Jacobs |
| 5,884,278 A | 3/1999 | Powell |
| 5,898,594 A | 4/1999 | Leason et al. |
| 5,900,608 A | 5/1999 | Iida |
| 5,905,246 A | 5/1999 | Fajkowski |
| 5,923,016 A | 7/1999 | Fredregill et al. |
| 5,930,771 A | 7/1999 | Stapp |
| 5,934,439 A | 8/1999 | Kanoh et al. |
| 5,936,452 A | 8/1999 | Utsuno et al. |
| 5,938,510 A | 8/1999 | Takahashi et al. |
| 5,941,363 A | 8/1999 | Partyka et al. |
| 5,943,423 A | 8/1999 | Muftic |
| 5,950,173 A | 9/1999 | Perkowski |
| 5,954,797 A | 9/1999 | Sidey |
| 5,956,694 A | 9/1999 | Powell |
| 5,959,869 A | 9/1999 | Miller et al. |
| 5,963,134 A | 10/1999 | Bowers et al. |
| 5,963,452 A | 10/1999 | Etoh et al. |
| 5,984,509 A | 11/1999 | Scott |
| 5,988,346 A | 11/1999 | Tedesco et al. |
| 5,988,431 A | 11/1999 | Roe |
| 5,997,170 A | 12/1999 | Brodbeck |
| 6,002,395 A | 12/1999 | Wagner et al. |
| 6,010,239 A | 1/2000 | Hardgrave et al. |
| 6,014,137 A | 1/2000 | Burns |
| 6,029,851 A | 2/2000 | Jenkins et al. |
| 6,039,244 A | 3/2000 | Finsterwald |
| 6,044,362 A | 3/2000 | Neely |
| 6,047,338 A | 4/2000 | Grolemund |
| 6,050,448 A | 4/2000 | Willis |
| 6,056,150 A | 5/2000 | Kasper |
| 6,056,194 A | 5/2000 | Kolls |
| 6,058,373 A | 5/2000 | Blinn et al. |
| 6,061,660 A | 5/2000 | Eggleston et al. |
| 6,062,478 A | 5/2000 | Izaguirre et al. |
| 6,072,481 A | 6/2000 | Matsushita et al. |
| 6,076,101 A | 6/2000 | Kamakura et al. |
| 6,078,848 A | 6/2000 | Bernstein et al. |
| 6,085,888 A | 7/2000 | Tedesco et al. |
| 6,101,483 A * | 8/2000 | Petrovich ............ G06Q 20/202 705/21 |
| 6,109,524 A | 8/2000 | Kanoh et al. |
| 6,115,649 A | 9/2000 | Sakata |
| 6,119,934 A | 9/2000 | Kolls |
| 6,123,223 A | 9/2000 | Watkins |
| 6,125,353 A | 9/2000 | Yagasaki |
| 6,126,036 A | 10/2000 | D'Alayer et al. |
| 6,134,547 A | 10/2000 | Huxley et al. |
| 6,138,911 A | 10/2000 | Fredregill et al. |
| 6,161,059 A | 12/2000 | Tedesco et al. |
| 6,164,528 A | 12/2000 | Hills et al. |
| 6,169,483 B1 | 1/2001 | Ghaffari et al. |
| 6,179,206 B1 | 1/2001 | Matsumori |
| 6,181,981 B1 | 1/2001 | Varga et al. |
| 6,182,857 B1 | 2/2001 | Hamm et al. |
| 6,195,661 B1 | 2/2001 | Filepp et al. |
| 6,199,141 B1 | 3/2001 | Weinreb et al. |
| 6,199,720 B1 | 3/2001 | Rudick et al. |
| 6,201,474 B1 | 3/2001 | Brady et al. |
| 6,202,006 B1 | 3/2001 | Scott |
| 6,209,322 B1 * | 4/2001 | Yoshida ............... E02F 9/2235 60/452 |
| 6,243,687 B1 | 6/2001 | Powell |
| 6,250,452 B1 | 6/2001 | Partyka et al. |
| 6,264,104 B1 | 7/2001 | Jenkins et al. |
| 6,269,285 B1 | 7/2001 | Mignault |
| 6,286,139 B1 | 9/2001 | Decinque |
| 6,289,322 B1 | 9/2001 | Kitchen et al. |
| 6,295,482 B1 | 9/2001 | Tognazzini |
| 6,298,972 B1 | 10/2001 | Tedesco et al. |
| 6,311,165 B1 | 10/2001 | Coutts et al. |
| 6,317,649 B1 | 11/2001 | Tedesco et al. |
| 6,321,985 B1 | 11/2001 | Kolls |
| 6,324,520 B1 | 11/2001 | Walker et al. |
| 6,327,230 B1 | 12/2001 | Miller et al. |
| 6,330,958 B1 | 12/2001 | Ruskin et al. |
| 6,334,110 B1 | 12/2001 | Walter et al. |
| 6,336,098 B1 | 1/2002 | Fortenberry et al. |
| 6,354,501 B1 | 3/2002 | Outwater et al. |
| 6,360,139 B1 | 3/2002 | Jacobs |
| 6,366,914 B1 | 4/2002 | Stern |
| 6,367,653 B1 | 4/2002 | Ruskin et al. |
| 6,367,696 B1 | 4/2002 | Inamitsu et al. |
| 6,397,126 B1 * | 5/2002 | Nelson ................. G06Q 20/20 700/231 |
| 6,397,199 B1 | 5/2002 | Goodwin, III |
| 6,412,654 B1 | 7/2002 | Cleeve |
| 6,415,555 B1 | 7/2002 | Montague |
| 6,415,950 B1 | 7/2002 | Robrechts |
| 6,416,270 B1 | 7/2002 | Steury et al. |
| 6,424,706 B1 | 7/2002 | Katz et al. |
| 6,430,470 B1 | 8/2002 | Nakajima et al. |
| 6,435,406 B1 | 8/2002 | Pentel |
| 6,438,447 B1 | 8/2002 | Belka et al. |
| 6,456,981 B1 | 9/2002 | Dejaeger et al. |
| 6,457,038 B1 | 9/2002 | Defosse |
| 6,462,644 B1 * | 10/2002 | Howell ................. G06Q 10/087 340/5.9 |
| 6,466,658 B2 | 10/2002 | Schelberg, Jr. et al. |
| 6,466,830 B1 | 10/2002 | Manross et al. |
| 6,477,503 B1 | 11/2002 | Mankes |

(56) References Cited

U.S. PATENT DOCUMENTS

| | | |
|---|---|---|
| 6,490,502 B2 | 12/2002 | Fellows et al. |
| 6,493,110 B1 | 12/2002 | Roberts |
| 6,505,095 B1 | 1/2003 | Kolls |
| 6,522,772 B1 | 2/2003 | Morrison et al. |
| 6,527,176 B2 | 3/2003 | Baric |
| 6,539,282 B2 | 3/2003 | Metcalf et al. |
| 6,540,100 B2 | 4/2003 | Credle, Jr. et al. |
| 6,575,363 B1 | 6/2003 | Leason et al. |
| 6,584,309 B1 | 6/2003 | Whigham |
| 6,584,450 B1 | 6/2003 | Hastings et al. |
| 6,584,564 B2 | 6/2003 | Olkin et al. |
| 6,587,748 B2 | 7/2003 | Baack |
| 6,587,835 B1 | 7/2003 | Treyz et al. |
| 6,595,342 B1 | 7/2003 | Maritzen et al. |
| 6,606,602 B1 | 8/2003 | Kolls |
| 6,628,764 B1 | 9/2003 | Petite |
| 6,640,159 B2 | 10/2003 | Holmes et al. |
| 6,644,455 B2 | 11/2003 | Ichikawa |
| 6,644,495 B2 | 11/2003 | Ruskin et al. |
| 6,655,580 B1 | 12/2003 | Ergo et al. |
| 6,658,323 B2 | 12/2003 | Tedesco et al. |
| 6,662,365 B1 | 12/2003 | Sullivan et al. |
| 6,675,067 B2 | 1/2004 | Blad |
| 6,688,523 B1 | 2/2004 | Koenck |
| 6,696,918 B2 | 2/2004 | Kucharczyk et al. |
| 6,707,380 B2 | 3/2004 | Maloney |
| 6,707,381 B1 | 3/2004 | Maloney |
| 6,708,879 B2 | 3/2004 | Hunt |
| 6,711,464 B1 | 3/2004 | Yap et al. |
| 6,711,465 B2 | 3/2004 | Tomassi |
| 6,715,403 B2 | 4/2004 | Hajek, Jr. et al. |
| 6,728,532 B1 | 4/2004 | Ahonen |
| 6,742,673 B2 | 6/2004 | Credle, Jr. et al. |
| 6,748,296 B2 | 6/2004 | Banerjee et al. |
| 6,748,539 B1 | 6/2004 | Lotspiech |
| 6,754,559 B2 | 6/2004 | Itako |
| 6,757,585 B2 | 6/2004 | Ohtsuki et al. |
| 6,792,334 B2 | 9/2004 | Metcalf et al. |
| 6,794,634 B2 | 9/2004 | Hair, III et al. |
| 6,814,256 B2 | 11/2004 | Clark |
| 6,847,861 B2 | 1/2005 | Wangu et al. |
| 6,850,816 B2 | 2/2005 | Garratt |
| 6,851,092 B2 | 2/2005 | Chang et al. |
| 6,854,642 B2 | 2/2005 | Metcalf et al. |
| 6,923,371 B2 | 8/2005 | Goodfellow |
| 6,932,270 B1 | 8/2005 | Fajkowski |
| 6,954,732 B1 | 10/2005 | DeLapa et al. |
| 6,959,285 B2 | 10/2005 | Stefanik et al. |
| 6,959,286 B2 | 10/2005 | Perkowski |
| 6,965,869 B2 | 11/2005 | Tomita et al. |
| 6,968,365 B2 | 11/2005 | Hollstrom et al. |
| 6,970,837 B1 | 11/2005 | Walker et al. |
| 6,980,887 B2 | 12/2005 | Varga et al. |
| 6,985,607 B2 | 1/2006 | Alasia et al. |
| 7,024,381 B1 | 4/2006 | Hastings et al. |
| 7,024,390 B1 | 4/2006 | Mori et al. |
| 7,043,497 B1 | 5/2006 | Carty et al. |
| 7,053,773 B2 | 5/2006 | McGarry et al. |
| 7,058,581 B1 | 6/2006 | Young |
| 7,076,328 B2 | 7/2006 | Piikivi |
| 7,076,329 B1 | 7/2006 | Kolls |
| 7,079,230 B1 | 7/2006 | McInerney et al. |
| 7,079,822 B2 | 7/2006 | Gunji et al. |
| 7,079,922 B2 | 7/2006 | Komai |
| 7,085,556 B2 | 8/2006 | Offer |
| 7,085,727 B2 | 8/2006 | VanOrman |
| 7,101,139 B1 | 9/2006 | Benedict |
| 7,108,180 B2 | 9/2006 | Brusso et al. |
| 7,139,731 B1 | 11/2006 | Alvin |
| 7,167,842 B1 | 1/2007 | Josephson, II et al. |
| 7,167,892 B1 | 1/2007 | Defosse et al. |
| 7,174,317 B2 | 2/2007 | Phillips et al. |
| 7,191,952 B2 | 3/2007 | Blossom |
| 7,203,675 B1 | 4/2007 | Papierniak et al. |
| 7,209,893 B2 | 4/2007 | Nii |
| 7,213,753 B2 * | 5/2007 | Barton ................ A47F 9/047 235/375 |
| 7,233,916 B2 * | 6/2007 | Schultz .............. G06Q 30/0609 340/309.16 |
| 7,234,609 B2 * | 6/2007 | DeLazzer ............... G07F 7/069 221/10 |
| 7,236,942 B1 | 6/2007 | Walker et al. |
| 7,236,946 B2 | 6/2007 | Bates et al. |
| 7,240,805 B2 | 7/2007 | Chirnomas |
| 7,240,843 B2 | 7/2007 | Paul et al. |
| 7,310,612 B2 | 12/2007 | McQueen, III et al. |
| 7,315,629 B2 | 1/2008 | Alasia et al. |
| 7,347,359 B2 | 3/2008 | Boyes et al. |
| 7,350,230 B2 | 3/2008 | Forrest |
| 7,366,586 B2 | 4/2008 | Kaplan et al. |
| 7,389,243 B2 | 6/2008 | Gross |
| 7,406,693 B1 | 7/2008 | Goodwin, III |
| 7,412,073 B2 | 8/2008 | Alasia et al. |
| 7,444,296 B1 | 10/2008 | Barber et al. |
| 7,447,605 B2 | 11/2008 | Kuehnrich |
| 7,499,768 B2 | 3/2009 | Hoersten et al. |
| 7,584,869 B2 | 9/2009 | DeLazzer et al. |
| 7,747,346 B2 | 6/2010 | Lowe et al. |
| RE41,543 E | 8/2010 | Satchell, Jr. et al. |
| 7,774,233 B2 | 8/2010 | Barber et al. |
| 7,787,987 B2 | 8/2010 | Kuehnrich et al. |
| 7,797,077 B2 | 9/2010 | Hale |
| 7,797,164 B2 | 9/2010 | Junger et al. |
| 7,853,354 B2 | 12/2010 | Kuehnrich et al. |
| 7,853,600 B2 | 12/2010 | Herz et al. |
| 7,860,606 B2 | 12/2010 | Rudy |
| 7,925,973 B2 | 4/2011 | Allaire et al. |
| 7,988,049 B2 | 8/2011 | Kuehnrich |
| 8,036,774 B2 | 10/2011 | Blust et al. |
| 8,041,454 B2 | 10/2011 | Blust et al. |
| 8,060,249 B2 | 11/2011 | Bear et al. |
| 8,078,316 B2 | 12/2011 | Blust et al. |
| 8,079,044 B1 * | 12/2011 | Craner ............... H04N 21/4532 725/28 |
| 8,086,349 B2 | 12/2011 | Blust et al. |
| 8,234,207 B2 | 7/2012 | Breitenbach et al. |
| 8,235,247 B2 | 8/2012 | Alvarez |
| 8,306,908 B1 | 11/2012 | Barker et al. |
| 8,352,449 B1 | 1/2013 | Parekh et al. |
| 8,386,347 B2 | 2/2013 | Hoblit |
| 8,412,374 B2 | 4/2013 | Kuehnrich et al. |
| 8,417,380 B2 | 4/2013 | Kuehnrich et al. |
| 8,463,432 B2 | 6/2013 | Weinshenker |
| 8,510,171 B2 | 8/2013 | Pederson et al. |
| 8,676,594 B2 * | 3/2014 | Takushima ............ G06Q 30/02 705/1.1 |
| 8,752,093 B2 * | 6/2014 | White ................... H04N 7/173 725/34 |
| 9,043,854 B2 * | 5/2015 | Poli .................... H04N 21/2541 725/120 |
| 2001/0011252 A1 | 8/2001 | Kasahara |
| 2001/0011680 A1 | 8/2001 | Soltesz et al. |
| 2001/0027357 A1 | 10/2001 | Grobler |
| 2001/0035425 A1 | 11/2001 | Rocco et al. |
| 2001/0037207 A1 | 11/2001 | Dejaeger |
| 2001/0047223 A1 | 11/2001 | Metcalf et al. |
| 2002/0029196 A1 | 3/2002 | Metcalf et al. |
| 2002/0046122 A1 | 4/2002 | Barber et al. |
| 2002/0046123 A1 | 4/2002 | Nicolini |
| 2002/0065579 A1 | 5/2002 | Tedesco et al. |
| 2002/0074397 A1 | 6/2002 | Matthews |
| 2002/0082917 A1 | 6/2002 | Takano |
| 2002/0084322 A1 | 7/2002 | Baric |
| 2002/0087334 A1 | 7/2002 | Yamaguchi et al. |
| 2002/0095680 A1 | 7/2002 | Davidson |
| 2002/0125314 A1 | 9/2002 | Jenkins et al. |
| 2002/0133269 A1 | 9/2002 | Anselmi |
| 2002/0161475 A1 | 10/2002 | Varga et al. |
| 2002/0165787 A1 | 11/2002 | Bates et al. |
| 2002/0165788 A1 | 11/2002 | Bates et al. |
| 2002/0165821 A1 | 11/2002 | Tree |
| 2002/0169715 A1 | 11/2002 | Ruth et al. |
| 2002/0183882 A1 | 12/2002 | Dearing et al. |
| 2002/0195491 A1 | 12/2002 | Bunch, III |

(56) References Cited

U.S. PATENT DOCUMENTS

| | | |
|---|---|---|
| 2003/0004828 A1 | 1/2003 | Epstein |
| 2003/0009408 A1 | 1/2003 | Korin |
| 2003/0023453 A1 | 1/2003 | Hafen et al. |
| 2003/0030539 A1 | 2/2003 | McGarry et al. |
| 2003/0033054 A1 | 2/2003 | Yamazaki |
| 2003/0057219 A1 | 3/2003 | Risolia |
| 2003/0061094 A1 | 3/2003 | Banerjee et al. |
| 2003/0105554 A1 | 6/2003 | Eggenberger et al. |
| 2003/0125961 A1 | 7/2003 | Janda |
| 2003/0130762 A1 | 7/2003 | Tomassi |
| 2003/0149510 A1 | 8/2003 | Takahashi |
| 2003/0154141 A1 | 8/2003 | Capazario et al. |
| 2003/0163382 A1 | 8/2003 | Stefanik et al. |
| 2003/0163399 A1* | 8/2003 | Harper .............. G06F 17/30893 705/35 |
| 2003/0167231 A1 | 9/2003 | Winking et al. |
| 2003/0204289 A1 | 10/2003 | Banerjee et al. |
| 2003/0212471 A1 | 11/2003 | Chakravarti |
| 2004/0006537 A1 | 1/2004 | Zelechoski et al. |
| 2004/0010340 A1 | 1/2004 | Guindulain Vidondo |
| 2004/0016620 A1 | 1/2004 | Davis |
| 2004/0030446 A1 | 2/2004 | Guindulain Vidondo |
| 2004/0050648 A1 | 3/2004 | Carapelli |
| 2004/0064347 A1 | 4/2004 | VanOrman |
| 2004/0064377 A1 | 4/2004 | Ergo et al. |
| 2004/0065579 A1 | 4/2004 | Wood |
| 2004/0068346 A1 | 4/2004 | Boucher |
| 2004/0068451 A1 | 4/2004 | Lenk et al. |
| 2004/0078328 A1 | 4/2004 | Talbert et al. |
| 2004/0079798 A1 | 4/2004 | Messenger et al. |
| 2004/0133466 A1 | 7/2004 | Redmond et al. |
| 2004/0133653 A1 | 7/2004 | Defosse et al. |
| 2004/0153413 A1 | 8/2004 | Gross |
| 2004/0158503 A1 | 8/2004 | Gross |
| 2004/0158504 A1 | 8/2004 | Gross |
| 2004/0158871 A1 | 8/2004 | Jacobson |
| 2004/0162633 A1 | 8/2004 | Kraft et al. |
| 2004/0162783 A1 | 8/2004 | Gross |
| 2004/0172274 A1 | 9/2004 | Gross |
| 2004/0172275 A1 | 9/2004 | Gross |
| 2004/0172342 A1 | 9/2004 | Gross |
| 2004/0186783 A1 | 9/2004 | Knight et al. |
| 2004/0243479 A1 | 12/2004 | Gross |
| 2004/0243480 A1 | 12/2004 | Gross |
| 2004/0249711 A1 | 12/2004 | Walker et al. |
| 2004/0254676 A1 | 12/2004 | Blust et al. |
| 2004/0256402 A1 | 12/2004 | Chirnomas |
| 2004/0260600 A1 | 12/2004 | Gross |
| 2004/0267604 A1 | 12/2004 | Gross |
| 2004/0267640 A1 | 12/2004 | Bong et al. |
| 2005/0022239 A1 | 1/2005 | Meuleman |
| 2005/0027648 A1* | 2/2005 | Knowles .............. G06Q 20/04 705/38 |
| 2005/0033855 A1 | 2/2005 | Moradi et al. |
| 2005/0060062 A1 | 3/2005 | Walker et al. |
| 2005/0060246 A1 | 3/2005 | Lastinger et al. |
| 2005/0080510 A1 | 4/2005 | Bates et al. |
| 2005/0085946 A1 | 4/2005 | Visikivi et al. |
| 2005/0086127 A1 | 4/2005 | Hastings et al. |
| 2005/0091069 A1 | 4/2005 | Chuang |
| 2005/0096936 A1 | 5/2005 | Lambers |
| 2005/0109836 A1 | 5/2005 | Ben-Aissa |
| 2005/0177494 A1 | 8/2005 | Kelly et al. |
| 2005/0197855 A1 | 9/2005 | Nudd et al. |
| 2005/0216120 A1 | 9/2005 | Rosenberg et al. |
| 2005/0230410 A1 | 10/2005 | DeLazzer et al. |
| 2005/0230473 A1 | 10/2005 | Fajkowski |
| 2005/0234911 A1 | 10/2005 | Hess et al. |
| 2005/0251827 A1* | 11/2005 | Ellis .................. H04N 5/44543 725/47 |
| 2005/0261977 A1 | 11/2005 | Kiji et al. |
| 2005/0267819 A1 | 12/2005 | Kaplan |
| 2005/0274793 A1 | 12/2005 | Cantini et al. |
| 2005/0283434 A1 | 12/2005 | Hahn-Carlson et al. |
| 2005/0289032 A1 | 12/2005 | Hoblit |
| 2006/0026031 A1 | 2/2006 | Gentling |
| 2006/0026162 A1 | 2/2006 | Salmonsen |
| 2006/0041508 A1 | 2/2006 | Pham et al. |
| 2006/0045660 A1 | 3/2006 | Di Rosa |
| 2006/0074777 A1 | 4/2006 | Anderson |
| 2006/0095286 A1 | 5/2006 | Kimura |
| 2006/0095339 A1 | 5/2006 | Hayashi et al. |
| 2006/0096997 A1 | 5/2006 | Yeo |
| 2006/0122881 A1 | 6/2006 | Walker et al. |
| 2006/0149685 A1 | 7/2006 | Gross |
| 2006/0155575 A1 | 7/2006 | Gross |
| 2006/0184395 A1 | 8/2006 | Millwee |
| 2006/0190345 A1 | 8/2006 | Crowley |
| 2006/0212360 A1 | 9/2006 | Stefanik et al. |
| 2006/0212367 A1 | 9/2006 | Gross |
| 2006/0231612 A1 | 10/2006 | Walker et al. |
| 2006/0231613 A1 | 10/2006 | Walker et al. |
| 2006/0231614 A1 | 10/2006 | Walker et al. |
| 2006/0235746 A1 | 10/2006 | Hammond et al. |
| 2006/0235747 A1 | 10/2006 | Hammond et al. |
| 2006/0241966 A1 | 10/2006 | Walker et al. |
| 2006/0241967 A1 | 10/2006 | Gross |
| 2006/0242059 A1 | 10/2006 | Hansen |
| 2006/0247823 A1 | 11/2006 | Boucher |
| 2006/0247824 A1 | 11/2006 | Walker et al. |
| 2006/0254832 A1 | 11/2006 | Strong |
| 2006/0254862 A1 | 11/2006 | Hoersten |
| 2006/0259191 A1 | 11/2006 | Lowe |
| 2006/0265101 A1* | 11/2006 | Kaplan .............. G06Q 10/06311 700/231 |
| 2006/0265286 A1 | 11/2006 | Evangelist et al. |
| 2006/0266823 A1 | 11/2006 | Passen et al. |
| 2006/0273152 A1 | 12/2006 | Fields |
| 2007/0005438 A1 | 1/2007 | Evangelist et al. |
| 2007/0011093 A1 | 1/2007 | Tree |
| 2007/0011903 A1 | 1/2007 | Chang |
| 2007/0016599 A1* | 1/2007 | Plastina .............. G11B 27/031 |
| 2007/0050083 A1 | 3/2007 | Signorelli et al. |
| 2007/0050256 A1 | 3/2007 | Walker et al. |
| 2007/0050266 A1 | 3/2007 | Barber et al. |
| 2007/0051802 A1 | 3/2007 | Barber et al. |
| 2007/0055754 A1 | 3/2007 | Robbin et al. |
| 2007/0063020 A1 | 3/2007 | Barrafato |
| 2007/0063027 A1 | 3/2007 | Belfer et al. |
| 2007/0067429 A1* | 3/2007 | Jain .................. G06F 17/30029 709/223 |
| 2007/0084872 A1 | 4/2007 | Hair, III et al. |
| 2007/0084917 A1 | 4/2007 | Fajkowski |
| 2007/0094245 A1 | 4/2007 | Vigil |
| 2007/0095901 A1 | 5/2007 | Illingworth |
| 2007/0125104 A1 | 6/2007 | Ehlers |
| 2007/0130020 A1 | 6/2007 | Paolini |
| 2007/0136247 A1 | 6/2007 | Vigil |
| 2007/0156442 A1 | 7/2007 | Ali |
| 2007/0156578 A1 | 7/2007 | Perazolo |
| 2007/0162183 A1 | 7/2007 | Pinney et al. |
| 2007/0162184 A1 | 7/2007 | Pinney et al. |
| 2007/0169132 A1 | 7/2007 | Blust et al. |
| 2007/0175986 A1 | 8/2007 | Petrone et al. |
| 2007/0179668 A1 | 8/2007 | Mellin |
| 2007/0185776 A1 | 8/2007 | Nguyen et al. |
| 2007/0210153 A1 | 9/2007 | Walker et al. |
| 2007/0213871 A1 | 9/2007 | Whitten et al. |
| 2007/0252003 A1 | 11/2007 | Goldring et al. |
| 2007/0260603 A1 | 11/2007 | Tuscano et al. |
| 2007/0276537 A1 | 11/2007 | Walker et al. |
| 2007/0299737 A1 | 12/2007 | Plastina et al. |
| 2008/0005025 A1 | 1/2008 | Legere et al. |
| 2008/0027835 A1 | 1/2008 | LeMasters et al. |
| 2008/0040211 A1 | 2/2008 | Walker et al. |
| 2008/0097770 A1 | 4/2008 | Low et al. |
| 2008/0103945 A1 | 5/2008 | Cooper et al. |
| 2008/0116262 A1 | 5/2008 | Majer |
| 2008/0125906 A1 | 5/2008 | Bates et al. |
| 2008/0131255 A1 | 6/2008 | Hessler et al. |
| 2008/0153482 A1* | 6/2008 | Kongalath .............. H04W 8/06 455/432.1 |
| 2008/0155614 A1 | 6/2008 | Cooper et al. |
| 2008/0222690 A1 | 9/2008 | Kim |

(56) References Cited

U.S. PATENT DOCUMENTS

| | | |
|---|---|---|
| 2008/0239961 A1 | 10/2008 | Hilerio et al. |
| 2008/0249658 A1 | 10/2008 | Walker et al. |
| 2008/0275591 A1 | 11/2008 | Chirnomas et al. |
| 2008/0275974 A1 | 11/2008 | Rackiewicz |
| 2008/0313973 A1 | 12/2008 | Butler Rolf |
| 2009/0030931 A1 | 1/2009 | Khivesara et al. |
| 2009/0048932 A1 | 2/2009 | Barber |
| 2009/0089187 A1 | 4/2009 | Hoersten et al. |
| 2009/0113116 A1 | 4/2009 | Thompson et al. |
| 2009/0139886 A1 | 6/2009 | Blust et al. |
| 2009/0299824 A1 | 12/2009 | Barnes, Jr. |
| 2009/0326708 A1 | 12/2009 | Rudy et al. |
| 2010/0010964 A1 | 1/2010 | Skowronek et al. |
| 2010/0036808 A1 | 2/2010 | Lee |
| 2010/0042577 A1 | 2/2010 | Rinearson |
| 2010/0127013 A1 | 5/2010 | Butler |
| 2010/0138037 A1 | 6/2010 | Adelberg et al. |
| 2010/0153983 A1 | 6/2010 | Philmon et al. |
| 2010/0198400 A1 | 8/2010 | Pascal et al. |
| 2010/0211217 A1 | 8/2010 | Hirsh et al. |
| 2010/0274624 A1 | 10/2010 | Rochford et al. |
| 2010/0296908 A1 | 11/2010 | Ko |
| 2010/0314405 A1 | 12/2010 | Alvarez |
| 2010/0316468 A1 | 12/2010 | Lert et al. |
| 2011/0004536 A1 | 1/2011 | Hoersten et al. |
| 2011/0047010 A1 | 2/2011 | Arnold et al. |
| 2011/0060454 A1 | 3/2011 | Lowe et al. |
| 2011/0060456 A1 | 3/2011 | Lowe et al. |
| 2011/0093329 A1* | 4/2011 | Bodor ............ G06Q 30/02 705/14.42 |
| 2011/0103609 A1 | 5/2011 | Pelland et al. |
| 2011/0130873 A1 | 6/2011 | Yepez et al. |
| 2011/0131652 A1 | 6/2011 | Robinson et al. |
| 2011/0153060 A1 | 6/2011 | Yepez et al. |
| 2011/0153067 A1 | 6/2011 | Weinshenker |
| 2011/0153071 A1 | 6/2011 | Claessen |
| 2011/0238194 A1* | 9/2011 | Rosenberg ........ G06F 17/30035 700/94 |
| 2011/0238296 A1 | 9/2011 | Purks et al. |
| 2012/0046786 A1 | 2/2012 | Kuehnrich et al. |
| 2012/0059511 A1 | 3/2012 | Majer |
| 2012/0123587 A1 | 5/2012 | Mockus et al. |
| 2012/0233708 A1* | 9/2012 | Merrifield ............ G06F 21/10 726/30 |
| 2012/0310409 A1 | 12/2012 | Breitenbach et al. |
| 2012/0311633 A1 | 12/2012 | Mandrekar et al. |
| 2012/0330458 A1 | 12/2012 | Weiss |
| 2013/0046707 A1 | 2/2013 | Maskatia et al. |
| 2013/0060648 A1 | 3/2013 | Maskatia et al. |
| 2013/0238115 A1 | 9/2013 | Smith et al. |
| 2013/0310970 A1 | 11/2013 | Segal et al. |
| 2014/0052292 A1 | 2/2014 | Lowe |

FOREIGN PATENT DOCUMENTS

| | | |
|---|---|---|
| DE | 3529155 A1 | 2/1987 |
| EP | 0060643 A2 | 9/1982 |
| EP | 0205691 A1 | 12/1986 |
| EP | 0247876 A2 | 12/1987 |
| EP | 0249367 A2 | 12/1987 |
| EP | 0287367 A1 | 10/1988 |
| EP | 0572119 A2 | 12/1993 |
| EP | 0986033 A2 | 3/2000 |
| EP | 1367549 A1 | 12/2003 |
| EP | 2113892 A1 | 11/2009 |
| EP | 1396824 B1 | 7/2010 |
| EP | 2249367 A1 | 11/2010 |
| FR | 2549624 A1 | 1/1985 |
| FR | 2559599 A1 | 8/1985 |
| FR | 2562293 A1 | 10/1985 |
| GB | 380926 A | 9/1932 |
| GB | 2143662 A | 2/1985 |
| GB | 2172720 A | 9/1986 |
| GB | 2402242 A | 12/2004 |
| JP | S55156107 A | 12/1980 |
| JP | S5647855 A | 4/1981 |
| JP | H02178795 A | 7/1990 |
| JP | H0362189 A | 3/1991 |
| JP | H03119496 A | 5/1991 |
| JP | H10247982 A | 9/1998 |
| JP | 2000149136 A | 5/2000 |
| JP | 2003036328 A | 2/2003 |
| JP | 2004094857 A | 3/2004 |
| JP | 2009043143 A | 2/2009 |
| KR | 1019990066053 | 8/1999 |
| KR | 20030089154 A | 11/2003 |
| KR | 20040069053 A | 8/2004 |
| KR | 20060080175 A | 7/2006 |
| KR | 20060114658 A | 11/2006 |
| KR | 20070021301 A | 2/2007 |
| WO | 8700948 A1 | 2/1987 |
| WO | 8705425 A1 | 9/1987 |
| WO | 8804085 A1 | 6/1988 |
| WO | 8806771 A1 | 9/1988 |
| WO | 9300644 A1 | 1/1993 |
| WO | 9404446 A1 | 3/1994 |
| WO | 9618972 A1 | 6/1996 |
| WO | 9847799 A1 | 10/1998 |
| WO | 9924902 A1 | 5/1999 |
| WO | 0038120 A1 | 6/2000 |
| WO | 0072160 A1 | 11/2000 |
| WO | 0225552 A2 | 3/2002 |
| WO | 0229708 A1 | 4/2002 |
| WO | 2004064377 A2 | 7/2004 |
| WO | 2004070646 A2 | 8/2004 |
| WO | 2005062887 A2 | 7/2005 |
| WO | 2006112817 A1 | 10/2006 |
| WO | 2006116108 A2 | 11/2006 |
| WO | 2006116109 A2 | 11/2006 |
| WO | 2006116110 A2 | 11/2006 |
| WO | 2006116112 A1 | 11/2006 |
| WO | 2006116113 A2 | 11/2006 |
| WO | 2006116114 A2 | 11/2006 |
| WO | 2006116115 A2 | 11/2006 |
| WO | 2006116116 A2 | 11/2006 |
| WO | 2006130638 A2 | 12/2006 |
| WO | 2007012816 A1 | 2/2007 |
| WO | 2009032946 A1 | 3/2009 |
| WO | 2010048375 A1 | 4/2010 |
| WO | 2011022689 A2 | 2/2011 |
| WO | 2011028727 A2 | 3/2011 |
| WO | 2011028728 A2 | 3/2011 |
| WO | 2011031532 A2 | 3/2011 |
| WO | 2013025392 A2 | 2/2013 |

OTHER PUBLICATIONS

International Search Report for Application No. PCT/US2005/12563, mailed on Aug. 10, 2005, 1 page.
International Search Report for Application No. PCT/US2006/15125, mailed on Jan. 11, 2007, 1 page.
International Search Report for Application No. PCT/US2006/15126, mailed on Apr. 3, 2008, 1 page.
International Search Report for Application No. PCT/US2010/047371 mailed on Apr. 29, 2011, 3 pages.
International Search Report for Application No. PCT/US2010/050339 mailed on Dec. 13, 2010, 5 pages.
International Search Report for Application No. PCT/US2011/48686 mailed on Apr. 9, 2012, 5 pages.
International Search Report for Application No. PCT/US2012/024900 mailed on Oct. 19, 2012, 4 pages.
International Search Report for Application No. PCT/US2012/42329 mailed on Feb. 22, 2013, 13 pages.
Issue Rolling Stones Magazine, Film Rentals by Vending Machine, 1982.
Picture of U.S. Installation of Japanese Manufactured VHS Rental Kiosk, 1984.
Supplemental European Search Report for Application No. EP05736275 mailed on Jan. 21, 2009, 2 pages.
Supplemental European Search Report for Application No. EP10810691 mailed on Feb. 26, 2013, 3 pages.

(56) References Cited

OTHER PUBLICATIONS

Supplemental European Search Report for Application No. EP10814374 mailed on Jan. 16, 2015, 4 pages.
Supplemental European Search Report for Application No. EP10814375 mailed on Jan. 16, 2015, 4 pages.
Supplemental European Search Report for Application No. EP10815879 mailed on Mar. 19, 2013, 2 pages.
Supplemental European Search Report for Application No. EP11820476 mailed on Jun. 22, 2015, 2 pages.
Supplemental European Search Report for Application No. EP12799917 mailed on Sep. 19, 2014, 2 pages.
Supplemental European Search Report for Application No. EP12824303 mailed on Dec. 12, 2014, 2 pages.
Supplementary European Search Report for Application No. EP05736275, mailed on Jan. 30, 2009, 3 pages.
Technophobe's best friend by MaClatchy, Smith Erika, McClatchy-Tribune Business news Oct. 22, 2007.
Article 34 Amendment for PCT Application No. PCT/US2010/046872, mailed on Jun. 28, 2011.
Canadian Office Action for Canadian Patent Application No. 2566324, mailed on Aug. 9, 2011.
"Canadian Office Action for Canadian Patent Application No. 2604730, mailed on Aug. 27, 2015.".
Communication from International Searching Authority transmitting International Search Report and Written Opinion, mailed Aug. 10, 2005 for International Application PCT/US05/12563.
European Office Action for EP Patent Application No. 11004042.5, mailed on Aug. 5, 2011.
European Search Report for Application No. EP11004042, mailed on Jul. 28, 2011, 2 pages.
"European Search Report for Application No. EP1280399, mailed on Aug. 19, 2015, 8 pages.".
Examination Report for EP 05736275.8, mailed on May 15, 2009.
"Examination Report for European Patent Application No. 12824303.7 mailed Mar. 7, 2016".
International Preliminary Report on Patentability for Application No. PCT/US2005/12563, mailed on Apr. 7, 2006, 3 pages.
International Preliminary Report on Patentability for Application No. PCT/US2006/15125, mailed on Jan. 11, 2007, 4 pages.
International Preliminary Report on Patentability for Application No. PCT/US2006/15126, mailed on Apr. 3, 2008, 6 pages.
International Preliminary Report on Patentability for Application No. PCT/US2006/15127, mailed on Jun. 19, 2008, 4 pages.
International Preliminary Report on Patentability for Application No. PCT/US2006/15129, mailed on Sep. 20, 2006, 4 pages.
International Preliminary Report on Patentability for Application No. PCT/US2006/15130, mailed on Apr. 23, 2007, 56 pages.
International Preliminary Report on Patentability for Application No. PCT/US2006/15131, mailed on Jul. 7, 2008, 4 pages.
International Preliminary Report on Patentability for Application No. PCT/US2006/15132, mailed on Nov. 16, 2007, 4 pages.
International Preliminary Report on Patentability for Application No. PCT/US2006/15133, mailed on Jun. 6, 2007, 4 pages.
International Preliminary Report on Patentability for Application No. PCT/US2010/046219, mailed on Feb. 28, 2011, 6 pages.
International Preliminary Report on Patentability for Application No. PCT/US2010/046872, mailed on Sep. 7, 2011, 14 pages.
International Preliminary Report on Patentability for Application No. PCT/US2010/047371, mailed on Apr. 29, 2011, 7 pages.
International Preliminary Report on Patentability for Application No. PCT/US2010/047374, mailed on May 2, 2011, 7 pages.
International Preliminary Report on Patentability for Application No. PCT/US2010/050339, mailed on Apr. 12, 2012, 9 pages.
International Preliminary Report on Patentability for Application No. PCT/US2011/48686, mailed on Mar. 7, 2013, 6 pages.
International Preliminary Report on Patentability for Application No. PCT/US2012/024900, mailed on Aug. 29, 2013, 6 pages.
International Preliminary Report on Patentability for Application No. PCT/US2012/049773, mailed Dec. 3, 2013, 28 pages.
International Search Report and Written Opinion for Application No. PCT/US2005/012563, mailed on Aug. 10, 2005, 4 pages.
International Search Report and Written Opinion for Application No. PCT/US2006/015125, mailed on Jan. 11, 2007, 4 pages.
International Search Report and Written Opinion for Application No. PCT/US2006/015126, mailed on Apr. 3, 2008, 6 pages.
International Search Report and Written Opinion for Application No. PCT/US2006/015127, mailed on Jun. 19, 2008, 4 pages.
International Search Report and Written Opinion for Application No. PCT/US2006/015129, mailed on Sep. 20, 2006, 4 pages.
International Search Report and Written Opinion for Application No. PCT/US2006/015130, mailed on Nov. 22, 2006, 4 pages.
International Search Report and Written Opinion for Application No. PCT/US2006/015131, mailed on Jul. 7, 2008, 4 pages.
International Search Report and Written Opinion for Application No. PCT/US2006/015132, mailed on May 10, 2007, 4 pages.
International Search Report and Written Opinion for Application No. PCT/US2006/015133, mailed on Jun. 6, 2007, 4 pages.
International Search Report and Written Opinion for Application No. PCT/US2010/046219, mailed on Feb. 28, 2011, 10 pages.
International Search Report and Written Opinion for Application No. PCT/US2010/046872, mailed on Mar. 29, 2011, 7 pages.
International Search Report and Written Opinion for Application No. PCT/US2010/047371, mailed on Apr. 29, 2011, 9 pages.
International Search Report and Written Opinion for Application No. PCT/US2010/047374, mailed on May 2, 2011, 9 pages.
International Search Report and Written Opinion for Application No. PCT/US2011/048686, mailed on Apr. 9, 2012, 9 pages.
International Search Report and Written Opinion for Application No. PCT/US2011/050339, mailed on Feb. 29, 2012, 8 pages.
International Search Report and Written Opinion for Application No. PCT/US2012/024900, mailed on Oct. 19, 2012, 8 pages.
International Search Report and Written Opinion for Application No. PCT/US2012/042329, mailed on Feb. 22, 2013, 28 pages.
International Search Report and Written Opinion for Application No. PCT/US2012/049773, mailed on Feb. 28, 2013, 8 pages.
International Search Report and Written Opinion for Application No. PCT/US2013/029414, mailed on Jun. 26, 2013, 7 pages.
International Search Report and Written Opinion for Application No. PCT/US2013/029424, mailed on Jun. 21, 2013, 9 pages.
International Search Report and Written Opinion for Application No. PCT/US2013/029443, mailed on Jun. 21, 2013, 13 pages.
International Search Report for Application No. PCT/US06/015129, mailed on Sep. 20, 2006, 1 page.
International Search Report for Application No. PCT/US06/15130, mailed on Nov. 22, 2006, 1 page.
International Search Report for Application No. PCT/US06/15132, mailed on May 10, 2007, 1 page.

\* cited by examiner

SYSTEM AND METHOD FOR APPLYING PARENTAL CONTROL LIMITS FROM CONTENT PROVIDERS TO MEDIA CONTENT

CROSS-REFERENCE TO RELATED APPLICATION

This application is a continuation application of U.S. patent application Ser. No. 13/567,948, filed Aug. 6, 2012, entitled "SYSTEM AND METHOD FOR APPLYING PARENTAL CONTROL LIMITS FROM CONTENT PROVIDERS TO MEDIA CONTENT", which claims priority from U.S. Provisional Patent Application No. 61/523,257, filed Aug. 12, 2011, entitled "SYSTEM AND METHOD FOR APPLYING PARENTAL CONTROL LIMITS FROM CONTENT PROVIDERS TO MEDIA CONTENT", both of which are incorporated herein by reference in its entirety.

TECHNICAL FIELD

This invention relates to a system and method for applying parental control limits from content providers to media content. More particularly, the present invention provides a system and method for the retrieval, aggregation, and application of parental control limits from content providers.

BACKGROUND AND SUMMARY OF THE INVENTION

While the present invention is often described herein with reference to a digital video disc, Blu-Ray disc, and video game distribution system, an application to which the present invention is advantageously suited, it will be readily apparent that the present invention is not limited to that application and can be employed in article dispensing systems used to distribute a wide variety of dispensable articles.

The digital video disc (DVD) player has been one of the most successful consumer electronics product launches in history. The market for DVD movie video, Blu-Ray movie video, and video game rentals is enormous and growing. Millions of households have acquired DVDs since they were introduced in 1997. In the first quarter of 2003 alone, it was estimated that well over three million DVD players were shipped to U.S. retailers.

In 2003, brick-and-mortar stores dominated the movie video and video game rental landscape in the U.S. Statistics showed that two brick-and-mortar companies controlled nearly sixty-five percent of the home video rental business. One element repeatedly cited for success of certain brick-and mortar store video rental franchises was perceived high availability of new video releases. Consumers want entertainment on demand, and through stocking multiple units of each new release, successful brick-and-mortar companies meet this consumer demand.

The foregoing indicates that there is a significant market potential for aligning regular routines of consumers (e.g., shopping, getting coffee or gas or going to a convenience store) with their DVD, Blu-Ray, and video game rental activities.

One improved article dispensing machine is disclosed in commonly owned U.S. Pat. No. 7,234,609, which is herein incorporated by reference in its entirety. The invention of the U.S. Pat. No. 7,234,609 and the present invention can function as an article dispensing machine-based distribution system that will typically have multiple units of each new release per article dispensing machine. The dispensing machines of the U.S. Pat. No. 7,234,609 and the present invention can stock up to two thousand DVDs, Blu-Ray, video games, or other discs (movies, games or other entertainment content), making the system competitive with existing brick-and-mortar video rental superstores.

The dispensing machine and system of the U.S. Pat. No. 7,234,609 and the present invention distinguishes itself from such stores by offering major benefits not conventionally offered by such stores, including additional cross-marketing programs (e.g., promotional rentals for a certain amount of dollars spent at the retail location) and convenience (e.g., open always).

The dispensing machine of the U.S. Pat. No. 7,234,609 and the present invention yields a competitive advantage in the DVD, Blu-Ray disc, and video game rental marketplace by offering consumers cross-marketing/promotional programs, convenience of selection (e.g., computer-based searches for movies and recommendations based on consumer profiles), and potentially extended hours. The present invention employs a more cost-effective, convenient platform than brick-and-mortar stores. In addition, with the present invention, dispensing machines can be situated in retail locations having high foot traffic, such as at a popular grocery store, restaurant, drug store, and/or other popular retail location.

The dispensing machine of the U.S. Pat. No. 7,234,609 and the present invention can be operated at a substantial savings over the costs associated with traditional brick-and-mortar video rental stores. For example, the present invention does not require hourly employees manning the dispensing machines or restocking them with inventories, due to the ability of the article transport storage units to be delivered to/picked up from retail locations by third-party delivery services, such as traditional or contracted courier services.

Unlike brick-and-mortar stores, the dispensing machine of the U.S. Pat. No. 7,234,609 and the present invention does not require an on-site store manager because all operational decisions can be made at a centralized location by a management team officed remote from the retail locations. Unlike brick-and-mortar stores, the dispensing machine of the U.S. Pat. No. 7,234,609 and the present invention does not require significant physical space. Unlike brick-and-mortar stores, the dispensing machine of the U.S. Pat. No. 7,234,609 and the present invention has low operating costs because no heating or air conditioning is required for the dispensing machines and they consume a relatively low level of electrical energy. In addition, the dispensing machine of the U.S. Pat. No. 7,234,609 has low maintenance costs and downtime.

The dispensing machine of the U.S. Pat. No. 7,234,609 and the present invention addresses the shortcomings of traditional brick-and-mortar stores in a convenient and cost-effective delivery vehicle having the added bonus of serving as an effective promotional platform that drives incremental sales to retail locations. In addition, the dispensing machine of the U.S. Pat. No. 7,234,609 and the present invention overcomes these disadvantages by at least offering more new releases and older selections for any given time period, and lower cost per viewing with significantly more convenience than Internet-based and pay-per-view services.

The dispensing machine of the U.S. Pat. No. 7,234,609 and the present invention is a fully automated, integrated DVD, Blu-Ray, and video game rental and/or purchase systems. It preferably incorporates robust, secure, scalable software that provides a fully personalized user experience and real-time feedback to retail locations and advertisers, scalable hardware that leverages existing technologies such as touch screen, focused audio speakers and video monitors, technology utilizing the Internet through a system website or mobile/consumer electronics device application, and an article transport storage unit that facilitates the exchange of new discs for old discs in each machine with virtually no need for human intervention. These technologies and others fill long-felt needs in the art and give advantages over conventional video distribution options. The dispensing machine of the U.S. Pat. No. 7,234,609 and the present invention functions as much as a promotional platform as it does a rental kiosk.

By utilizing the dispensing machines and the fully-interactive, real-time, linked Internet website or mobile/consumer electronics device applications, consumers can rent one or more DVDs, Blu-Ray discs, video games, or other entertainment content directly from dispensing machines as well as indirectly by making a rental reservation through the website or application for later pickup at a conveniently located machine. These dispensing machines are preferably networked with each other, with the inventory control and/or supply office and with the system website or application by phone-line, DSL, wireless network, or other Internet connection at each retail location. Through this linked network, the rental experience for each consumer can be customized based on a profile for each consumer, such as via personalized home pages and rental screens.

Existing media content parental control systems allow a user to set restrictions and limits on viewing of media content on a per-device basis. However, the user must enter the desired parental control limits separately on each electronic device. For example, a parent can set parental control limits on a cable television set-top box but must separately set parental control limits on an account for a digital media content provider. Furthermore, existing media content parental control systems utilize content ratings or other restrictions that are specific to the type of media content provided by the content provider, such as a Motion Picture Association of America (MPAA) film content rating, a TV Parental Guidelines television content rating, or an Entertainment Software Rating Board (ESRB) video game content rating. The user may become frustrated in having to set the parental control limits on multiple electronic devices and/or on a website, even if the parental control limits involve the same types of settings.

The present invention allows for filtering of media content based on parental control limits stored in a customer profile. A list of the media content may be filtered based on the parental control limits. The present invention also allows for modification of access to media content based on the parental control limits. Access to the media content may also be modified based on the parental control limits. Access to the media content may include restricting access to media articles from an article dispensing machine and/or media selections at a content provider. The present invention overcomes disadvantages of existing media content parental control systems by aggregating the parental control limits from multiple content providers in the customer profile. Moreover, the present invention allows for electronic devices, such as a computer, consumer electronics device, or website interface, to access the aggregated parental control limits in the customer profile so that the parental control limits do not have to be re-entered on each of the electronic devices. Other features and advantages are provided by the following description and drawings.

DETAILED DESCRIPTION OF THE INVENTION

Figure 1:
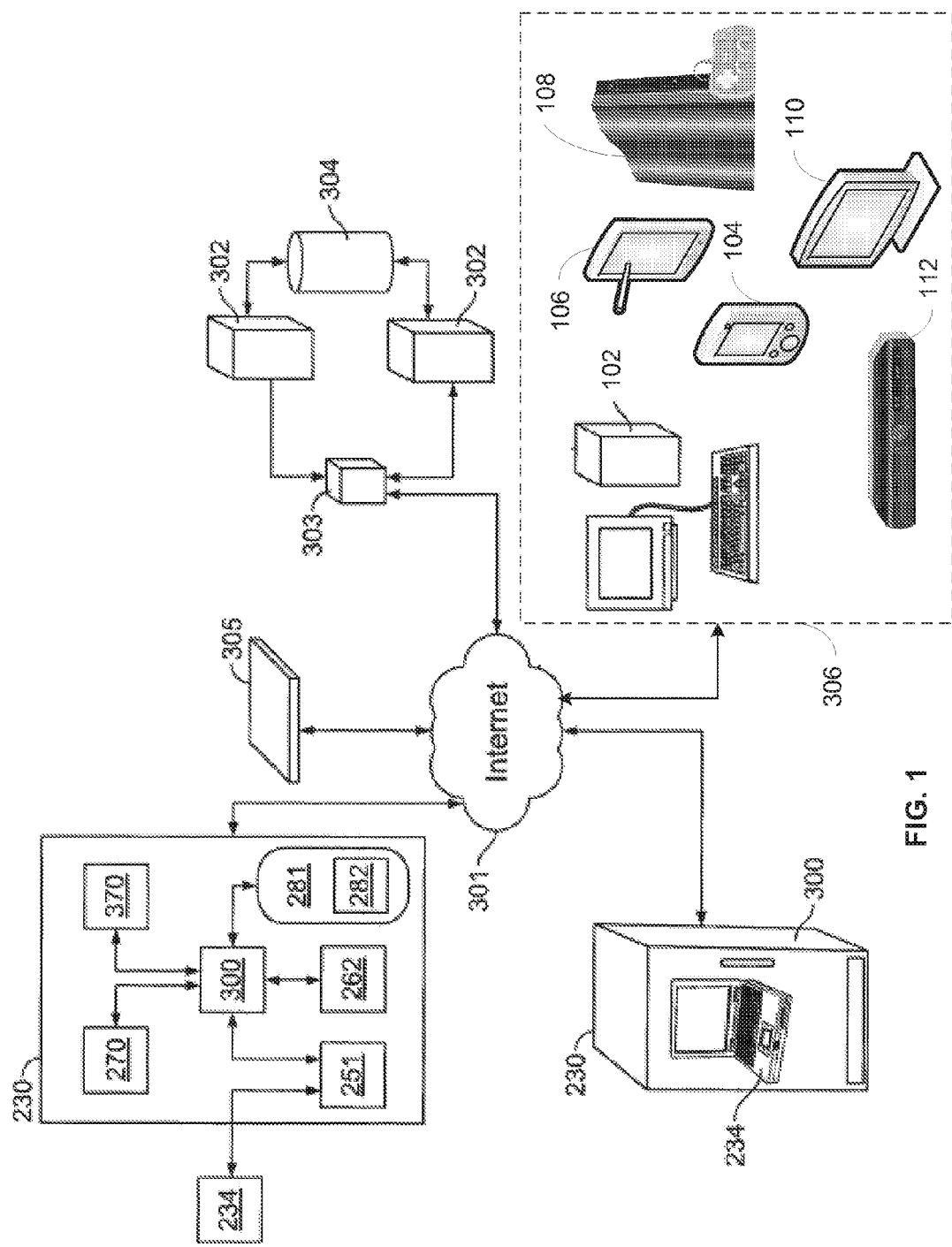
FIG. 1 is an illustration of a system for communicating and processing information in a network of article dispensing machines and dispensing apparatus.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
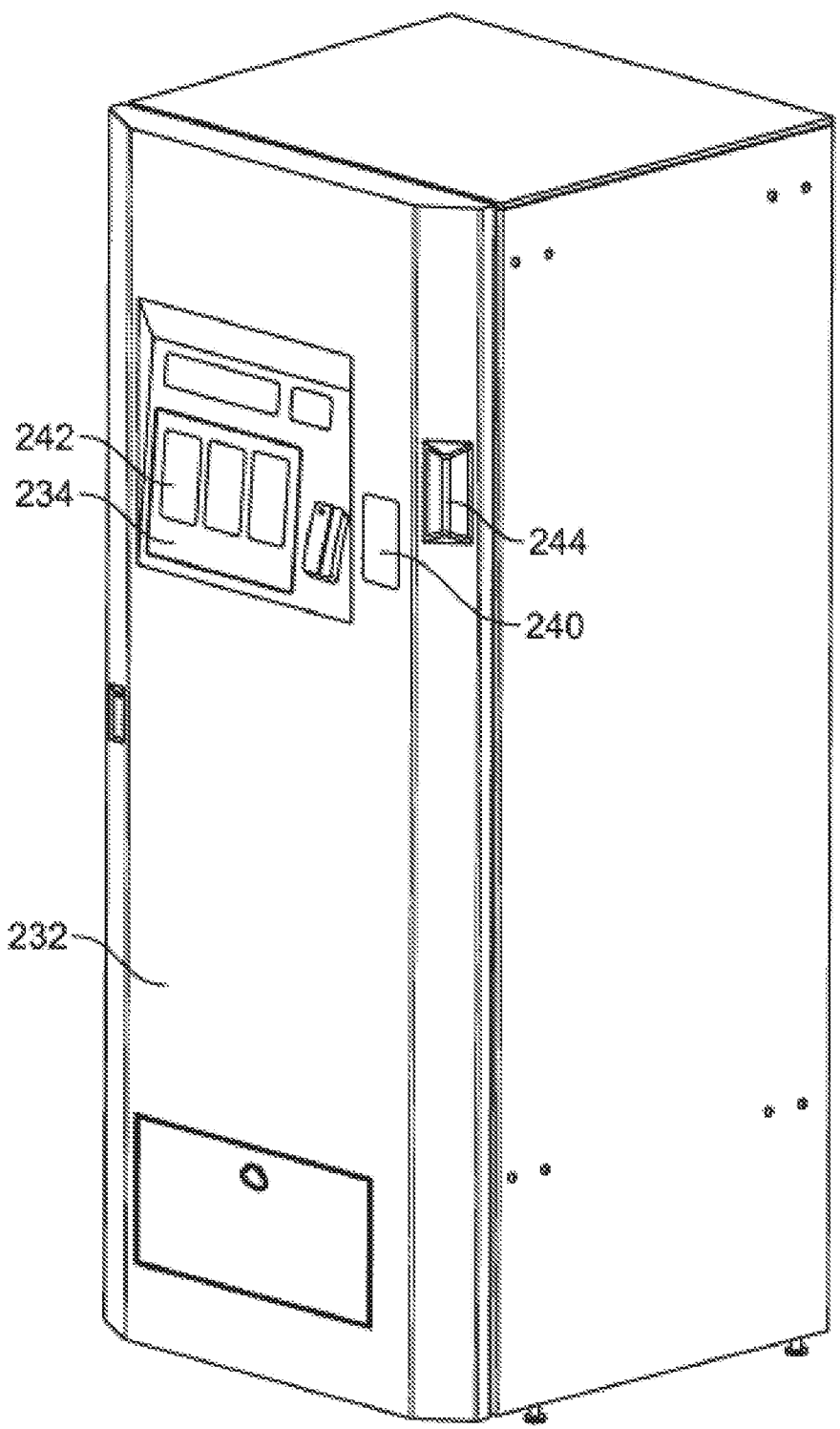
FIG. 2 is a perspective view of an article dispensing machine constructed in accordance with the principles of the present invention.

FIGS. 1-2 illustrate an article dispensing machine designated 230. Article dispensing machine 230 is one of a plurality of article dispensing machines included within an article distribution system having a plurality of such machines situated at a plurality of retail locations. The article dispensing machines of a particular article distribution system preferably form a network. As such, those machines are preferably in electrical communication with each other and with a central server or central controller.

As shown in FIG. 1, each article dispensing machine 230 includes a dispensing machine processor 300, also referred to herein as a vending controller, which is connected to a first sensor 270 and a second sensor 370, a first motor 251 and a second motor 262 and a user interface control system 234, collectively referred to as "the peripheral devices." The processor is capable of executing various programs to provide input to and/or receive outputs from the peripheral devices. Suitable processors for such use are known to those of skill in the art. In addition, the processor is operably connected to at least one memory storage device 281, such as a hard-drive or flash-drive or other suitable memory storage device.

Article dispensing machine memory storage device 281 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, article dispensing machine memory storage device 281 may incorporate electronic, magnetic, optical, and/or other types of storage media. Article dispensing machine memory storage device 281 can have a distributed architecture where various components are situated remote from one another, but are still accessed by processor. Article dispensing machine memory storage device includes an article dispensing machine database 282.

The article dispensing machines 230 preferably comprise a network of machines in communication with one another. As shown in FIG. 1, in the preferred configuration, the article dispensing machines 230 are networked with one another via a central server or central controller 302 in a hub-and-spoke system. However, optionally, the article dispensing machines may be connected and communicate directly with one another, and/or subsets of article dispensing machines may communicate with one another directly as well as with the central server 302.

Figure 3:
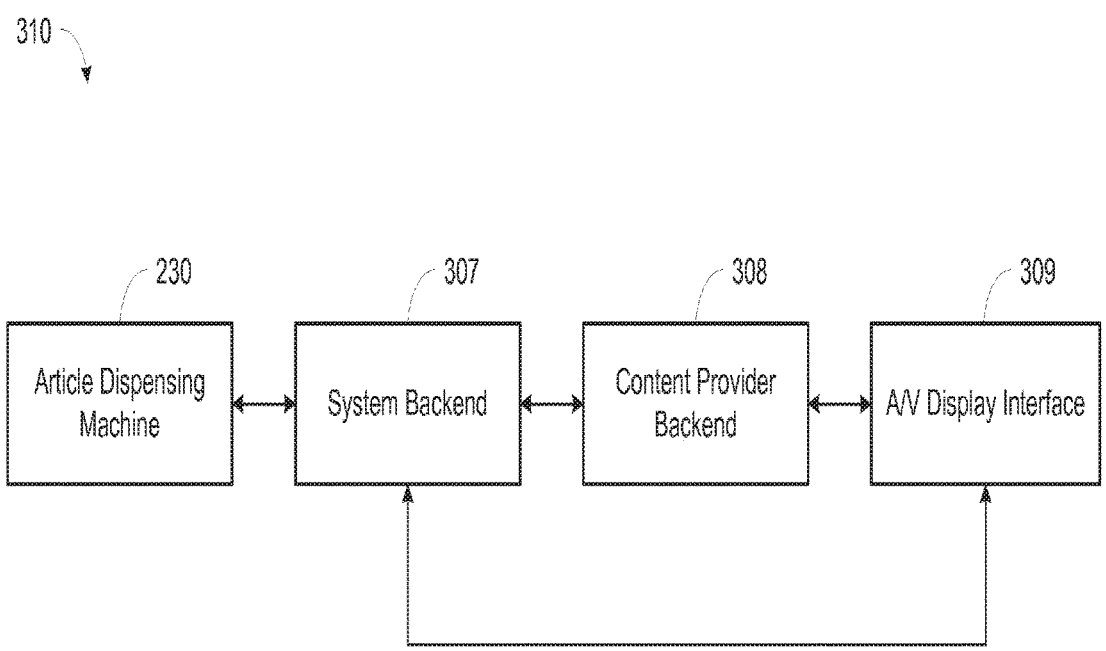
FIG. 3 is a high-level block diagram illustrating a networked media content system and connections including an article dispensing machine, a system backend, a content provider backend, and an A/V display interface.

Generally, in terms of hardware architecture, the central server 302 and the content provider backend 308 shown in FIG. 3 include a central processor and/or controller, central memory, and one or more input and/or output (I/O) devices (or peripherals) that are communicatively coupled via a local interface. The architecture of the central server 302 is set forth in greater detail in U.S. Pat. No. 7,234,609, the contents of which are incorporated herein by reference. Numerous variations of the architecture of the central server 302 and the content provider backend 308 would be understood by one of skill in the art and are encompassed within the scope of the present invention.

The processor/controller is a hardware device for executing software, particularly software stored in memory. The processor can be any custom made or commercially available processor, a central processing unit (CPU), an auxiliary processor among several processors associated with the server 302, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. The processor may also represent a distributed processing architecture such as, but not limited to, SQL, Smalltalk, APL, KLisp, Snobol, Developer 200, MUMPS/Magic.

The software in memory may include one or more separate programs. The separate programs comprise ordered listings of executable instructions for implementing logical functions. The software in memory includes a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers, smartphones, or personal digital assistants (PDAs) (e.g., PalmOS available from Palm Computing, Inc., Windows CE or Windows Phone available from Microsoft Corporation, iOS available from Apple Inc, Android available from Google Inc., BlackBerry OS available from Research in Motion Limited, Symbian available from Nokia Corp.). The operating system essentially controls the execution of other computer programs and provides scheduling, input-output control, file and data management, memory management, and communication control and related services.

Steps and/or elements, and/or portions thereof of the present invention may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system (O/S). Furthermore, the software embodying the present invention can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, Ada, and Lua.

When article dispensing machine 230 is in operation, the article dispensing machine processor is configured to execute software stored within article dispensing machine memory, to communicate data to and from the dispensing machine memory, and to generally control operations of article dispensing machine pursuant to the software. The software aspects of the present invention and the O/S, in whole or in part, but typically the latter, are read by processor, perhaps buffered within the processor, and then executed.

When the present invention or aspects thereof are implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For communication with the central server 302, article dispensing machine 230 is equipped with network communication equipment and circuitry. In a preferred embodiment, the network communication equipment includes a network card such as an Ethernet card. In a preferred network environment, each of the plurality of article dispensing machines 230 on the network is configured to use the TCP/IP protocol to communicate via the network 301. It will be understood, however, that a variety of network protocols could also be employed, such as IPX/SPX, Netware, PPP and others. It will also be understood that while a preferred embodiment of the present invention is for article dispensing machine 230 to have a "broadband" connection to the network 301, the principles of the present invention are also practicable with a dialup connection using a standard modem. Wireless network connections are also contemplated, such as wireless Ethernet, satellite, infrared, radio frequency, Bluetooth, near field communication, and cellular networks.

The central controller 302 communicates with the article dispensing machine controllers 300 via the network 301. The central controller 302 is preferably located at a central station or office that is remote from the plurality of article dispensing machines 230. The central controller 302 can operate as the server for communicating over the network 301 between the plurality of article dispensing machines 230. The central controller 302 receives communications and information from the article dispensing machines 230, and also transmits communications and information to the machines 230. For example, when a rental transaction is performed at the article dispensing machine 230, transaction data such as the rented title is then transmitted from the machine 230 to the central controller 302 via the network 301. It will be understood that central servers in general, such as the central controller 302, are often distributed. A plurality of central servers/controllers 302 may optionally be arranged in "load balanced" architecture to improve the speed and efficiency of the network. To accomplish the implementation of multiple controllers 302, the controllers 302 may be in communication with a router/distributor 303.

The central controller 302 is also in communication with a central database 304. The central database 304 stores information regarding the transaction network. For example, the central database 304 stores data regarding the vending inventory at each of the plurality of article dispensing machines 230. The central database 304 also stores sales information regarding the sales quantities of the vending merchandise stored in the machines 230. For example, the central database 304 stores information regarding the sales totals for each title and for each machine 230 vending location. Central database 304 also stores user information and rental transaction information, such as user IDs, the date on which discs are due to be returned, the date on which discs were rented from the machines 230 and a list of valid coupon codes and restrictions associated with those codes. In certain embodiments, central database 304 also may be configured to store user PINs. Some of this information is also preferably stored in article dispensing machine database 282.

Central database 304 and databases in the content provider backend 308, such as the content provider customer profile database 502 and other databases, are preferably relational databases, although other types of database architectures may be used without departing from the principles of the present invention. For example, the databases 304 and 502 may be a SQL database, an Access database or an Oracle database, and in any such embodiment have the functionality stored herein. Central database 304 is also preferably capable of being shared, as illustrated, between a plurality of central controllers 302 and its information is also preferably capable of being transmitted via network 301. It will be understood that a variety of methods exist for serving the information stored in central database 304 and database 502. In one embodiment, .net and Microsoft Reporting Services are employed, however, other technologies such as ODBC, MySQL, CFML and the like may be used.

The central controller 302, central database 304, and components of the content provider backend 308 are also accessible by an electronic device 306, which may include a personal computer 102, mobile device 104 (e.g., smartphone, personal digital assistant, etc.), tablet computer 106, video game console 108, television 110, and Blu-Ray player 112. The electronic device 306 may be in direct or indirect communication with the central controller 302, central database 304, and/or the content provider backend 308 through a wired and/or wireless network connection, such as Ethernet, Wi-Fi, cellular (3G, 4G, etc.), or other type of connection. As a personal computer 102, the electronic device 306 will be understood as comprising hardware and software consistent with marketable personal and laptop computers, such as a display monitor, a keyboard, and a microprocessor. The electronic device 306 may also comprise Internet browser software such as Firefox, Internet Explorer, Chrome, or Safari. Using the browser software, a user of the electronic device 306 can access a web interface through the central controller 302. An application may also execute on the electronic device 306 that accesses the central controller 302. To that end, central controller 302 preferably comprises web server software such as IIS or Apache. It will be understood that a variety of web server software and web browser software exists to implement the principles of the present invention without departing therefrom. Through the web browser software or application, the electronic device 306 communicates with the central controller 302 and allows the user to login to a central command functionality of the central controller 302 and to view and modify data stored in the central database 304. The browser interface or application also allows the user to perform certain system functions, which will affect the inventory and behavior of the article dispensing machines 230. The electronic device 306 may communicate with the central controller 302, central database 304, components of the system backend 307, and components of the content provider backend 308 using rules and specifications of an application programming interface (API).

In a preferred embodiment, a financial server 305 is also in communication with the network 301. It will be understood that a variety of financial services exist for processing financial information via the Internet and other networks 301. Those services allow for the processing of credit card and debit card information, so that users of the services do not have to interface directly with credit and debit card companies. In FIG. 1, the financial server 305 is illustrated as a single server, although the financial server 305 may comprise an entire sub-network of financial servers 305 responsible for processing financial information.

As shown in FIG. 2, article dispensing machine 230 includes a machine housing 232 with front, rear, top, bottom and side panels. The machine housing 232 is preferably a combination molded fiberglass and sheet metal cabinet. However, those skilled in the art will appreciate that the housing can be constructed from a variety of other suitable materials and with a variety of other suitable manufacturing techniques.

As shown most clearly in FIG. 2, a user interface portion 234 of housing 232 includes a card reader 240, a keypad and/or touch screen 242 and an article transfer opening 244. The card reader 240 is preferably designed in known fashion to read magnetically encoded membership and/or credit/debit cards for authorizing the distribution of articles of inventory through the article transfer opening 244. Keypad and/or touch screen 242 permits consumers and/or inventory stocking personnel to communicate with the dispensing machine 230 and/or a central office linked in electrical communication with the dispensing machine. Keypad and/or touch screen 242 also permits consumers and/or inventory stocking personnel to enter appropriate commands directed to carrying out specific machine tasks. It will be appreciated that the optional touch screen includes a monitor made with known technologies making it capable of being utilized as a user interface for entry of commands designed to carry out machine tasks. The touch screen 242 may also be capable of displaying a QR (Quick Response) code to a customer. The customer may read the QR code with a camera on a mobile device or with a dedicated QR code reader. The QR code can represent a universal resource locator (URL) to access a digital media selection, for example.

Furthermore, it will be appreciated that additional user interface portions having additional or even identical user interface components could be incorporated within article dispensing machine 230. For example, these components could be incorporated on other panels of the housing 232 of machine 230 so that the machine can be used simultaneously by multiple consumers, translating into more efficient distribution of articles in high traffic areas. Dispensing machine 230 also preferably includes speaker units. Known audio technology may be incorporated within dispensing machine 230 to broadcast focused audio directed to relatively small (e.g., three square feet) locations in front of the machines from speaker units and/or in other designated locations at a retail site.

FIG. 3 illustrates a networked media content system 310 including an article dispensing machine 230, a system backend 307, a content provider backend 308, and an audio/visual (A/V) display interface 309. The networked media content system 310 provides for a variety of processes involving management, manipulation, searching, presentation, and notification related to digital media content and vendible physical media articles, including processes related to the present invention. The networked media content system 310 allows for direct and indirect communication between the components in the networked media content system 310 via one or more networks. The components in the networked media content system 310 may be operated by one or more entities. In one embodiment, the article dispensing machine(s) 230 and the system backend 307 are operated by a first entity, such as the operator of the article dispensing machines, while the content provider backend 308 and the A/V display interface 309 are operated by a second entity, such as a content provider. In another embodiment, all of the components shown in the networked media content system 310 of FIG. 3 are operated by the same entity. The physical media article may include at least a DVD, Blu-Ray disc, video game disc, or other media article including those that are out-of-stock or otherwise unavailable for rental. The digital media selections may include streaming video content, video-on-demand content, downloadable video content, streaming video games, downloadable video games, or other digital media. Streaming or downloadable video games may include content related to video games, such as expansion packs and add-on packs. Although FIG. 3 shows a single content provider backend 308 and a single A/V display interface 309, it is contemplated that more than one content provider backend and/or A/V display interfaces may be in communication with the system backend 307.

The system backend 307 includes components that primarily communicate information, such as transaction and inventory data, to and from the article dispensing machines 230. Components in the system backend 307 also communicate information to and from the content provider backend 308 and the A/V display interface 309. The system backend 307 is detailed below with reference to FIG. 4. The content provider backend 308 includes components that primarily communicate information to and from the A/V display interface 309. Components in the content provider backend 308 also communicate information to and from the system backend 307, as detailed further below. Data communicated between the article dispensing machines 230, the system backend 307, the content provider backend 308, and/or the A/V display interface 309 may utilize the XML (Extensible Markup Language) format. The electronic device 306 and the A/V display interface 309 may communicate with the system backend 307 and/or the content provider backend 308 using rules and specifications of an application programming interface (API).

The A/V display interface 309 can be a set-top box, a module of an internet-ready television, a Blu-Ray player with internet connectability, a software application executing on a mobile device, cable television converter box, satellite television set-top box, IPTV (Internet Protocol television) set-top box (including AT&T U-Verse), digital video recorder, tablet computer, video game console (including Microsoft Xbox family, Sony PlayStation family, Nintendo Wii, and similar devices), handheld gaming device (including Sony PlayStation Portable, Nintendo DS, and similar devices), laptop computer, desktop computer, streaming media box (including Apple TV, Google TV, Roku, Boxee, and similar devices), or any other device capable of receiving and displaying streaming, on-demand, and/or downloadable electronic media from a content provider. Moreover, applications may be installed and executed on the A/V display interface 309 that communicate with the system backend 307 and/or the content provider backend 308 to provide media content and other information to a user of the A/V display interface 309.

The article dispensing machines 230 can communicate with the system backend 307, including the central server and controller 302, via network communication equipment and circuitry, as detailed above. Furthermore, the system backend 307 can communicate with the content provider backend 308 and the A/V display interface 309 via the same or different network communication equipment and circuitry. In particular, the system backend 307 can directly communicate with the content provider backend 308 and the A/V display interface 309, or in one embodiment, the system backend 307 can communicate with the A/V display interface 309 through the content provider backend 308. It will also be understood that while a preferred embodiment of the present invention is for the components of the system 310 to have a "broadband" connection with one another, the principles of the present invention are also practicable with a dialup connection using a standard modem. Wireless network connections are also contemplated, such as wireless Ethernet, satellite, infrared, radio frequency, Bluetooth, near field communication, and cellular networks.

Each of the article dispensing machines 230 may operate without requiring continuous connectivity and communication with the central controller 302. In one embodiment, the central controller 302 only transmits data in response to communication from an article dispensing machine 230. For example, an article dispensing machine 230 may attempt to communicate with the central controller 302 following completion of one or more rental transactions or one or more media article return transactions. In another embodiment, the article dispensing machine 230 continues normal operations and transactions even if communication is interrupted or cannot be established with the central controller 302. In these cases, transaction data can be stored locally in the article dispensing machine 230, such as in the article dispensing machine memory storage device 281, until a predetermined time interval elapses, when a predetermined number of transactions is reached, or until communication with the central controller 302 can be reestablished. Once communication is established with the central controller 302, financial and inventory information can be uploaded and the appropriate servers and databases can be updated.

In one embodiment, the article dispensing machine 230 can display only media articles which are physically located at the article dispensing machine 230. In this way, a customer may browse on the user interface 234 only the media articles which are in-stock and available to rent at that article dispensing machine 230. Typically, the article dispensing machine 230 possesses media information for the media articles that are currently located in the article dispensing machine 230. The media information for a media article includes title, actor, director, studio, publisher, plot synopsis, format, description, parental rating, individualized ratings and reviews, popularity, article type, running time, genre, cover artwork, or other information. The article dispensing machine 230 can also store in memory the media information for recently-rented media articles that are no longer physically stored in the article dispensing machine 230. The article dispensing machine 230 can communicate with the central controller 302 when media information about a particular media article is needed. For example, when a particular media article is returned to an article dispensing machine 230 that does not have the corresponding media information for that particular media article, the article dispensing machine 230 can query the central controller 302, metadata database 410, and/or inventory database 412 for the media information. Once the media information is obtained, the article dispensing machine 230 may display that particular media article on the user interface 234 as in-stock and available to rent.

In another embodiment, the article dispensing machine 230 can display media articles that are both physically located and not physically located at the article dispensing machine 230. In this embodiment, media articles which are both available and unavailable to rent can be displayed. A media article may be unavailable to rent if it is not in-stock or is in-stock but has been reserved for rental. In one example, the entire catalog of media articles stored in the inventory database 412 can be displayed on the article dispensing machine 230. In another example, a subset of the entire catalog of media articles can be displayed on the article dispensing machine 230. The subset of media articles that can be displayed on the article dispensing machine 230 may be determined, for example, based on geographic location, retailer agreements, contractual obligations, customer rental habits, and other criteria. The media articles that can be displayed on the article dispensing machine 230 may include recently-rented media articles that are no longer physically stored in the article dispensing machine 230 or media articles that have never been physically in the article dispensing machine 230. For example, media articles that have never been physically in the article dispensing machine 230 may be displayed because those media articles may be available at a nearby article dispensing machine. In this case, those media articles may be displayed to the customer so that the customer has an option to obtain those media articles from the nearby article dispensing machine 230. In this embodiment, if a customer attempts to rent a media article that is out-of-stock, reserved for another customer, or otherwise cannot be vended at the particular article dispensing machine 230, then that media article can be deemed an unavailable media article. Although a physical unavailable media article cannot be rented from the particular article dispensing machine 230, a digital alternative media selection may be available and substituted for the unavailable media article.

Figure 4:
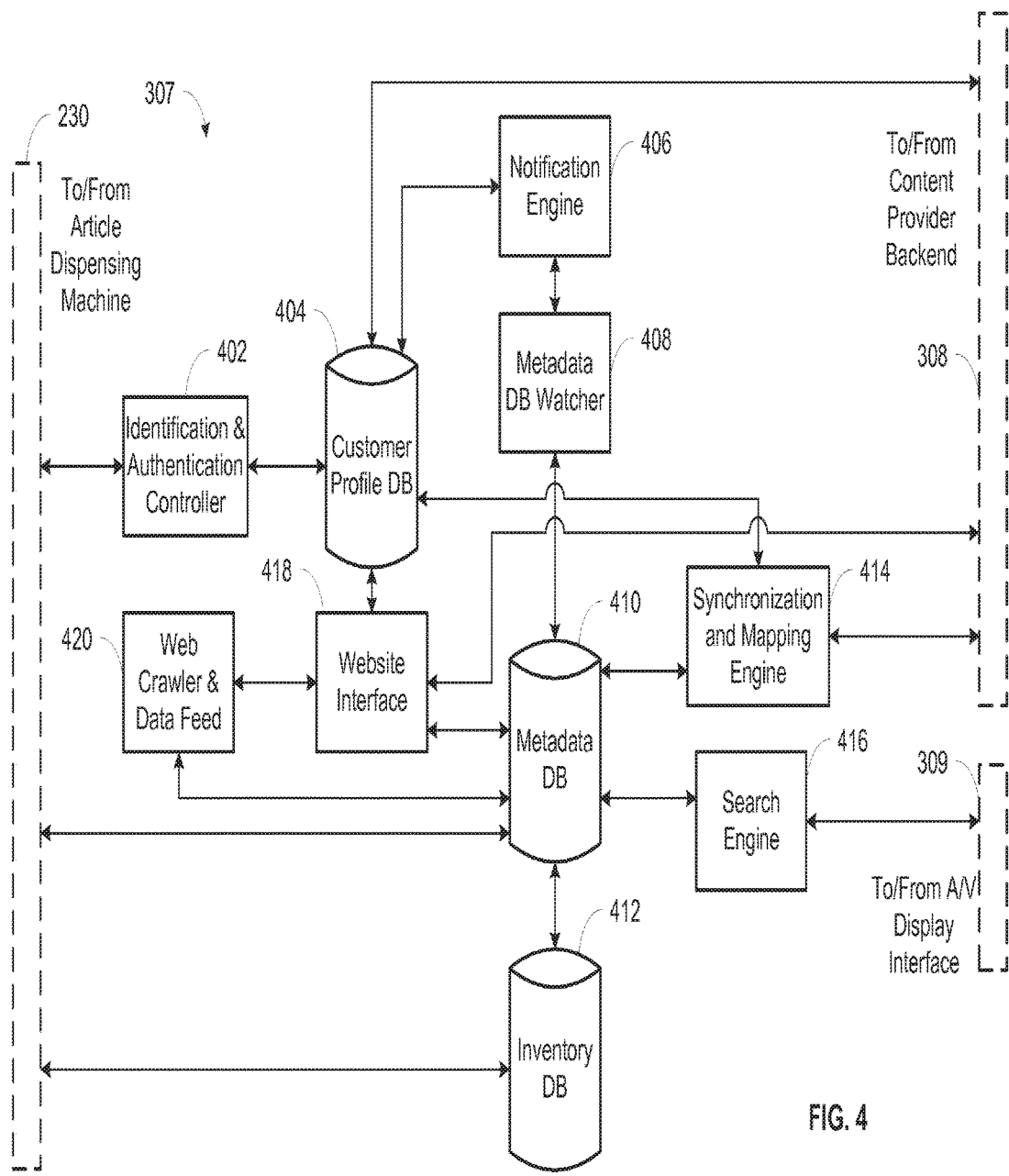
FIG. 4 is a block diagram illustrating the system backend.

FIG. 4 is a block diagram illustrating the system backend 307 and connections to and from the system backend 307 to the article dispensing machines 230, the content provider backend 308, and the A/V display interface 309. The system backend 307 includes components that provide and receive data to and from the article dispensing machines 230 during DVD, Blu-Ray disc, and video game rental transactions and other transactions. Components in the system backend 307 are utilized in relation to the present invention, as described below. It will be understood that components 402, 404, 406, 408, 414, 416, 418, and 420 in the system backend 307 may be implemented, for example, by the central controller 302 using instructions stored in a memory connected to the central controller 302. It will be further understood that the databases 404, 410, and 412 may be implemented as part of the central database 304 or as separate databases.

The identification and authentication controller 402 can receive a unique customer identifier that a customer provides to the article dispensing machines 230 during a rental transaction. The unique customer identifier can be a credit or debit card number, a hashed version of a credit or debit card number, or other unique identifier used for payment and/or identification purposes. In the case of hashing of the credit or debit card number, the hash function applied to the credit or debit card number is preferably implemented on the article dispensing machines 230 and may be, for example, a SHA-256 hashing algorithm. The identification and authentication controller 402 can validate the payment capability of a credit or debit card by communicating with the financial server 305.

Figure 5:
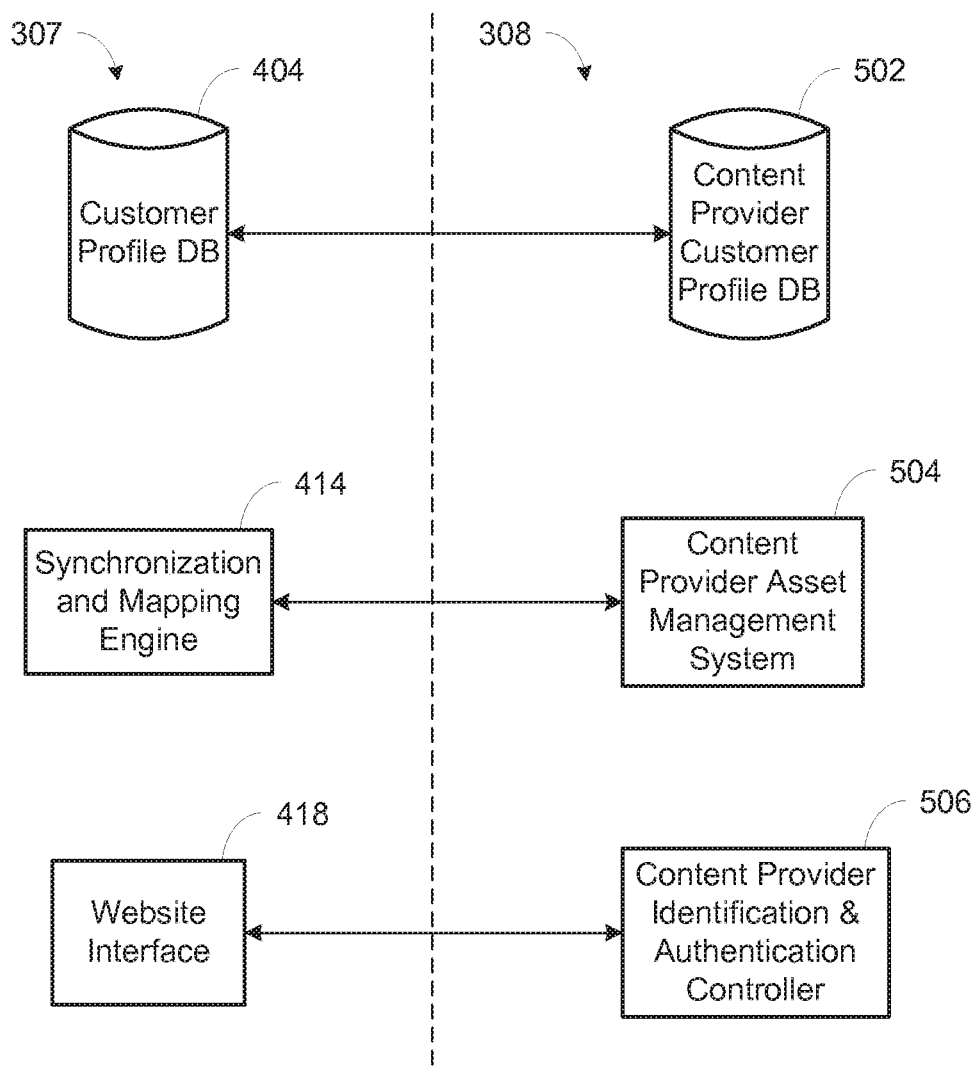
FIG. 5 is a block diagram illustrating connections between the system backend and the content provider backend.

A customer may be authenticated to multiple customer profiles and accounts by the identification and authentication controller 402. The unique customer identifier provided by the customer can authenticate the customer to an existing customer profile and account for the article dispensing machines 230. The existing customer profile and account can be stored and looked up using the unique customer identifier in the customer profile database 404 that is connected to the identification and authentication controller 402. The unique customer identifier can also link the existing customer account to a content provider customer account via a connection from the customer profile database 404 to the content provider customer profile database 502 in the content provider backend 308, as shown in FIG. 5. Zero, one, or more content provider customer accounts may be linked in the customer profile database 404 to the existing customer account for the article dispensing machines 230. A content provider may include, but is not limited to, a cable television operator, a satellite television service provider, an IPTV (Internet Protocol television) provider, an online gaming and digital media delivery service (Xbox Live, PlayStation Network, OnLive, etc.), a website (YouTube, Hulu, etc.), a movie studio, a television network, a game publisher, or a retailer (Best Buy, Walmart, etc.). Media selections available from a content provider may include videos on demand, streaming videos, downloadable videos, streaming video games, or downloadable video games. The media selections may be available through the A/V display interface 309 that is in communication with the content provider backend 308.

The customer profile database 404 can contain information related to customers of the article dispensing machines 230, including name, mailing and billing addresses, email addresses, phone and mobile numbers, username, password, payment methods, rental history, purchase history, preferred article dispensing machines, movie and video game genre preferences, customizations, subscriptions, parental controls, linked content provider accounts, content provider subscriptions and entitlements, and other data. A rental transaction can be personalized using information from the customer profile database 404 at the article dispensing machines 230 and a website interface 418. For example, only certain genres and titles of DVDs, Blu-Ray discs, or video games could be shown if a customer sets particular preferences that are then stored in the customer profile database 404. Some of the information stored in the customer profile database 404 may also be stored in the article dispensing machine database 282. The customer profile database 404 may include a service which facilitates interfacing and communicating with a notification engine 406 and other components of the system backend 307, for example.

The website interface 418 can be interactive and accessible to a customer using web browser software at an electronic device 306. The website interface 418 may also include a mobile application or consumer electronics device application. Rentable media articles may be searched, browsed, and reserved on the website interface 418 for receipt at the article dispensing machines 230. The location of and the inventory at article dispensing machines 230 can be viewed at the website interface 418. Digital media selections from content providers, such as streaming, downloadable, and on-demand media, may also be searched, browsed, and accessed on the website interface 418. A customer can access their customer profile on the website interface 418 for purposes of verifying and updating their personal information in the customer profile database 404. For example, a customer can link an account they have with a content provider on the website interface 418 by specifying their username, password, account number, and/or other identifying information for the content provider account. The system backend 307 can utilize SAML (Security Assertion Markup Language), OAuth (Open Authentication), or other protocols to authenticate the identity of the customer at the content provider via a connection from the website interface 418 to the content provider identification and authentication controller 506 in the content provider backend 308, as shown in FIG. 5. If the identifying information matches the content provider account, the linkage to the content provider account can be stored in the customer profile database 404.

An inventory database 412 may contain a catalog of physical media articles that may be rented at the article dispensing machines 230 and reserved at the website interface 418 for later receipt at the article dispensing machines 230. A catalog of digital media selections available at the content provider can be contained in the metadata database 410. Metadata for the media articles and media selections are stored in the metadata database 410, including title, release date, running time, chapter information, technical details (resolution, audio options, languages, etc.), format, peripheral device requirements, number of players, online capability, actors, voice actors, director, studio, publisher, developer, platform, availability of downloadable content, episode information, genre, critic ratings, individualized ratings (reviews, recommendations, likes, etc.), parental ratings (MPAA, ESRB, TV Parental Guidelines, etc.), description, related content, media artwork, media stills, and other information.

Physical media articles that may be rented at the article dispensing machines 230 and digital media selections available at the content provider may be synchronized and mapped to one another by matching their respective metadata. As seen in FIG. 5, a synchronization and mapping engine 414 connected to the customer profile database 404, the metadata database 410, and the content provider asset management system 504 in the content provider backend 308 may compare the metadata for the media articles and media selections to determine matches. Metadata in the content provider asset management system 504 for media selections can be compared to metadata in the metadata database 410 to perform the matching. For example, a combination of a title, release date, running time, and/or actor information can be used to map a media article to a corresponding media selection. In one embodiment, proprietary identification codes unique to a media article and a media selection can be used to map the media article to the corresponding media selection. The proprietary identification codes for the media article and the media selection can be stored in the metadata database 410 and the content provider asset management system 504, respectively. Such proprietary identification codes can be assigned to media articles and media selections by third party providers such as Rovi, Baseline, and AMG.

Figure 6:
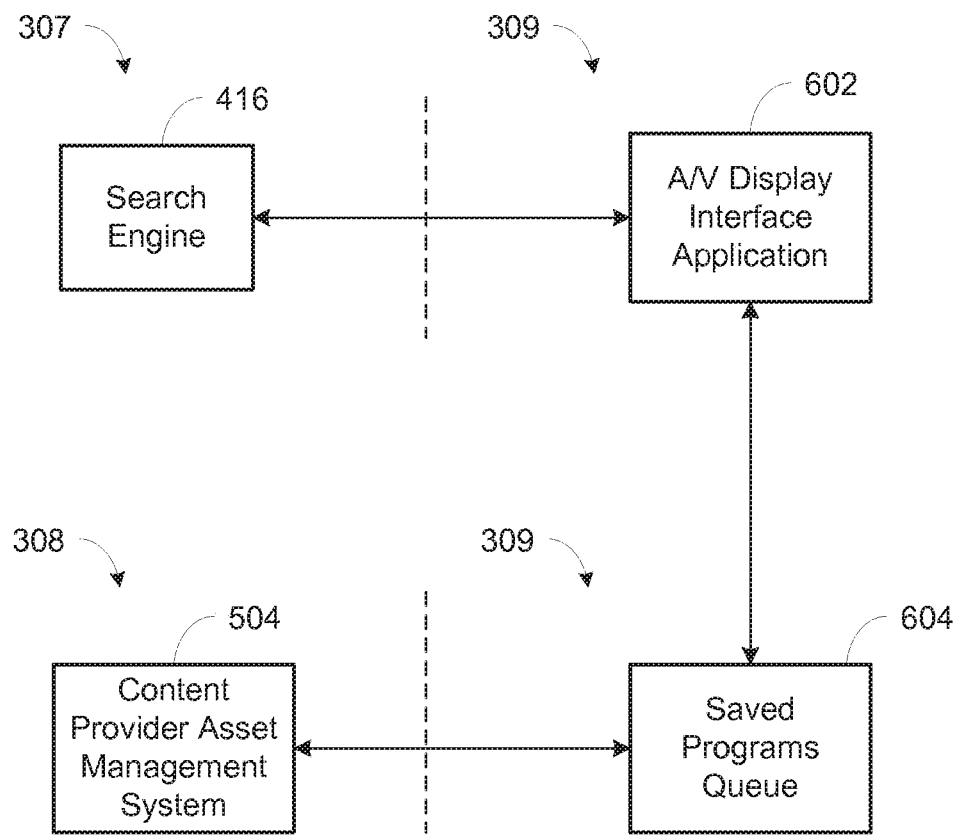
FIG. 6 is a block diagram illustrating connections between the system backend, the content provider backend, and the A/V display interface.

A media selection at a content provider can be placed in the saved programs queue 604 on the A/V display interface 309, as shown in FIG. 6, by providing the appropriate instructions to the content provider asset management system 504 in the content provider backend 308. Queuing a media selection may occur, for example, when a customer decides to purchase the digital media selection from the content provider in place of a physical media article at an article dispensing machine 230.

An inventory database 412 can be connected to the article dispensing machine 230 and the metadata database 410 to provide information regarding the availability of media articles in the article dispensing machines 230. In conjunction with a search engine 416, the inventory database 412 and the metadata database 410 can provide inventory results for media articles and media selections to an A/V display interface application 602 on an A/V display interface 309, as shown in FIG. 6. Such results may include the availability of physical media articles at the article dispensing machines 230 as well as digital media selections available at a content provider. The results may also be provided to the website interface 418 or other websites operated by a content provider, for example. The synchronization and mapping engine 414 can store the information from the content provider asset management system 504 regarding media selections at the content provider in the metadata database 410. The inventory database 412 can also supply the availability of media articles in the article dispensing machines 230 to the website interface 418 or to other portals, such as an application on a mobile device, when queried.

A metadata database watcher 408 can monitor the metadata database 410 for changes in metadata related to media articles and media selections. The metadata database watcher 408 can use customer watchlist subscriptions from a customer profile in the customer profile database 404 to determine what changes to monitor. The changes to the metadata can include inventory availability, content provider availability, release schedules, and other information related to a particular title. The customer watchlist subscriptions can be used by the metadata database watcher 408 to monitor these changes in combination with information regarding particular actors, directors, and/or other metadata. When a change corresponding to a customer watchlist subscription is found by the metadata database watcher 408, a notification engine 406 can transmit notifications and details of the change to the customer. The notifications may be sent via email, SMS, mobile application alerts, A/V display interface alerts, or other electronic channels.

A customer may also subscribe to be notified about new information and new media content related to their favorite actors, directors, titles, studios, and/or other parameters using customer notification subscriptions. Such information may include information related to live performances, television appearances, newspaper and magazine articles, blogs, and other content. A web crawler and data feed 420 can obtain this information by searching pertinent websites and through use of a public API connection to update the metadata database 410. The data feed in the web crawler and data feed 420 may include, for example, information that is pushed from an information source or pulled from an information source. The customer can subscribe to this information about their favorites at the website interface 418, for example. The metadata database watcher 408 monitoring the metadata database 410 can detect when there is a new piece of information about a favorite and transmit the desired notifications using the notification engine 406.

Figure 7:
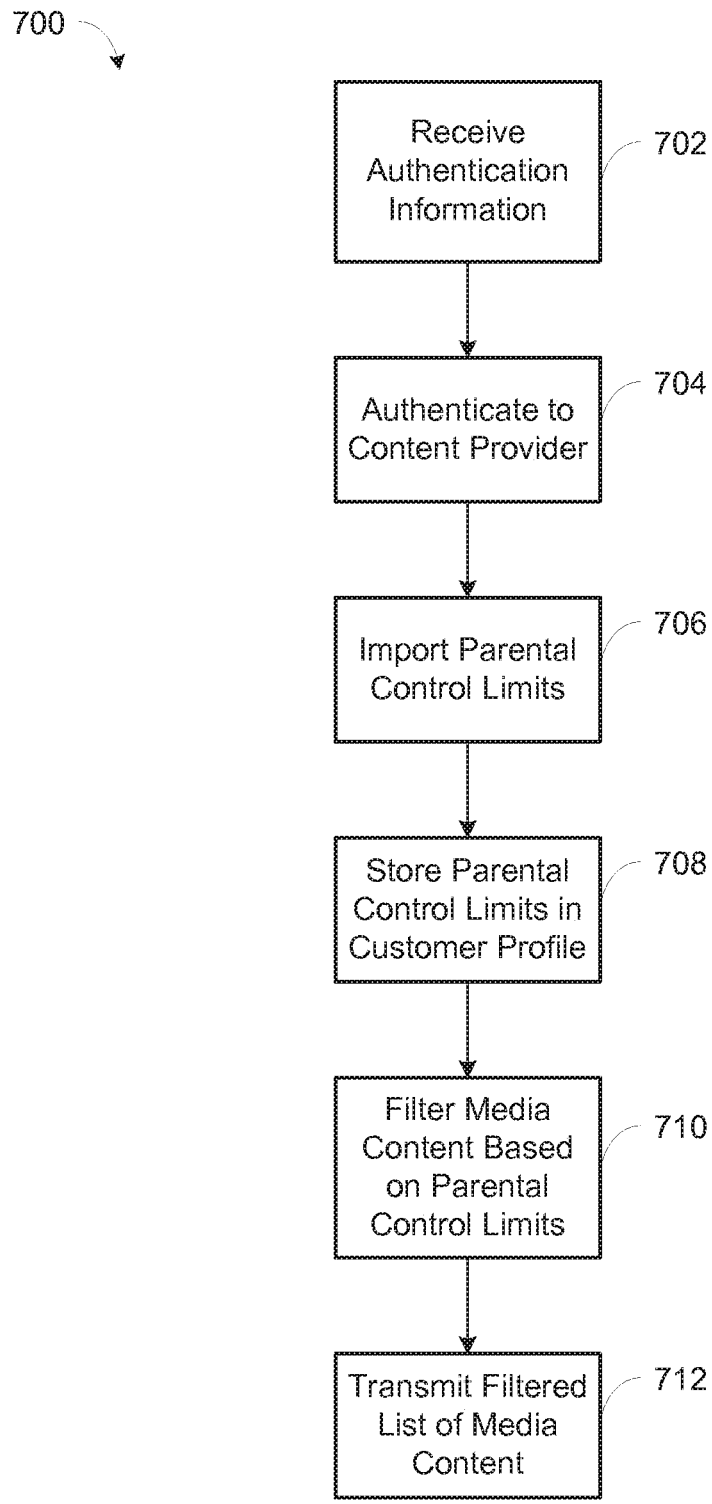
FIG. 7 is a flowchart illustrating operations for importing parental control limits into a customer profile.

An embodiment of a process 700 for filtering media content based on parental control limits in a customer profile is shown in FIG. 7. The process 700 can result in the transmission of a filtered list of media content, such as physical media articles and digital media selections, based on one or more parental control limits retrieved from one or more content providers. A user may have set parental control limits at a content provider, and the parental control limits may be stored and aggregated in the customer profile with parental control limits that have been set at other content providers. The customer profile may be stored in the customer profile database 404.

Parental control limits may include, but are not limited to, a television content rating, a film content rating, a video game content rating, a channel lock, a title restriction, an actor restriction, a time limitation, a time of day limitation, a functionality limitation, a purchase limitation, a do not list restriction, a content description restriction, and/or a metadata display restriction. In particular, the television parental rating may include the TV Parental Guidelines television content ratings and sub-ratings in the United States (e.g., TV-Y, TV-Y7, TV-Y7-FV, TV-G, TV-PG, TV-14, and TV-MA ratings and L, S, V, and D sub-ratings) and the Canadian TV Classification System content ratings in Canada (e.g., C, C8, G, PG, 14+, 18+, 21+, and E for English language programs, and G, 8+, 13+, 16+, 18+, and E for French language programs). The film content rating may include the Motion Picture Association of America (MPAA) film ratings in the United States (e.g., G, PG, PG-13, R, and NC-17) and the Canadian film classification ratings in Canada (e.g., G, PG, 14A, 18A, R, and A in provinces other than Quebec, and G, 13+, 16+, and 18+ in Quebec). The video game content rating may include the Entertainment Software Rating Board (ESRB) video game ratings in the United States, Canada, and Mexico (e.g., EC, E, E10+, T, M, and AO). A channel lock includes prohibiting the viewing or display of a particular channel or network. A title or actor restriction includes prohibiting viewing or display of a piece of media content that matches part or all of a particular title or actor name, respectively. A time limitation includes placing a limit on the amount of time that media content can be viewed, while a purchase limitation includes placing a limit on an amount that can be spent or placing a limit on the number of purchases.

A time of day limitation includes prohibiting the listing or viewing of media content based on a day, date, and/or time. A functionality limitation includes prohibiting or restricting a particular type of functionality, e.g., the purchase of a piece of media content, access to a piece of media content, viewing closed captioning, etc. A do not list restriction includes prohibiting the listing of media content based on a particular genre, channel, title, actor, studio, publisher, or other metadata of the media content. A content description restriction includes the restricting or prohibiting the listing of a description that accompanies a piece of media content, based on a keyword(s) set by the user. A metadata display restriction includes showing alternate wording (e.g., "Adult Content") in place of showing metadata corresponding to a piece of media content. Metadata which is blocked may include text (e.g., title, description, etc.), images (e.g., screenshots), and/or video (e.g., trailers). The parental control limits may be implemented individually or in any combination. In addition, the parental control limits may vary based on the associated customer profile or account. For example, a parent/adult account may have more less restrictive parental control limits than the parental control limits in a child account.

At step 702, authentication information may be received at the central controller 302. The authentication information may allow access to an account at a content provider that supports the setting of parental control limits. The account may include a parent/adult account, a child account, or any other type of account supported by the content provider. The authentication information may include a username and/or a password, for example. The central controller 302 may authenticate to the content provider at step 704, based on the authentication information received at step 702. Authentication to the content provider may be through a login to the website of the content provider, through an application programming interface (API) associated with the content provider, through a feed from the content provider, or through other methods. In one embodiment, content providers and the central controller 302 may have each have access to a shared database including parental control limits. The shared database may be part of central database 304 or may be situated remotely from the central controller 302 and the content provider.

The parental control limits that have been set at the content provider may be imported at step 706. A user, such as a parent, may have previously set the parental control limits at the content provider. The parental control limits at the content provider may be specific to the type of media content provided by the content provider. For example, if the content provider is a cable television operator, the parental control limits may include television content ratings and/or film content ratings. As another example, if the content provider is a streaming or downloadable video game operator, the parental control limits may include video game content ratings. The imported parental control limits may be stored at step 708 in the customer profile that is in the customer profile database 404. The parental control limits from the content providers may be aggregated together when stored at step 708. The aggregation of the parental control limits may be in a canonical data format that is neutral and encompasses parental control limits applicable for all types of media content. The canonical data format may utilize an XML format, for example, so that the parental control limits are represented in a standardized form.

In some embodiments, the parental control limits may have been previously set by a user at an electronic device 306, such as an Xbox video game console, a laptop computer, or a desktop computer. The user may have set the parental control limits as master settings through the operating system of the electronic device 306 for access by any applications executing on the electronic device 306, for example. The parental control limits may accordingly be maintained by the electronic device 306 in a central location on behalf of the user. At step 706, the parental control limits may be imported by an application executing on the electronic device 306 from the electronic device 306 and/or the operating system of the electronic device 306. The application may import the parental control limits through an API, for example. The application may store the imported parental control limits at step 708 locally and/or in the customer profile. The imported parental control limits may also be aggregated together when stored at step 708.

Figure 8:
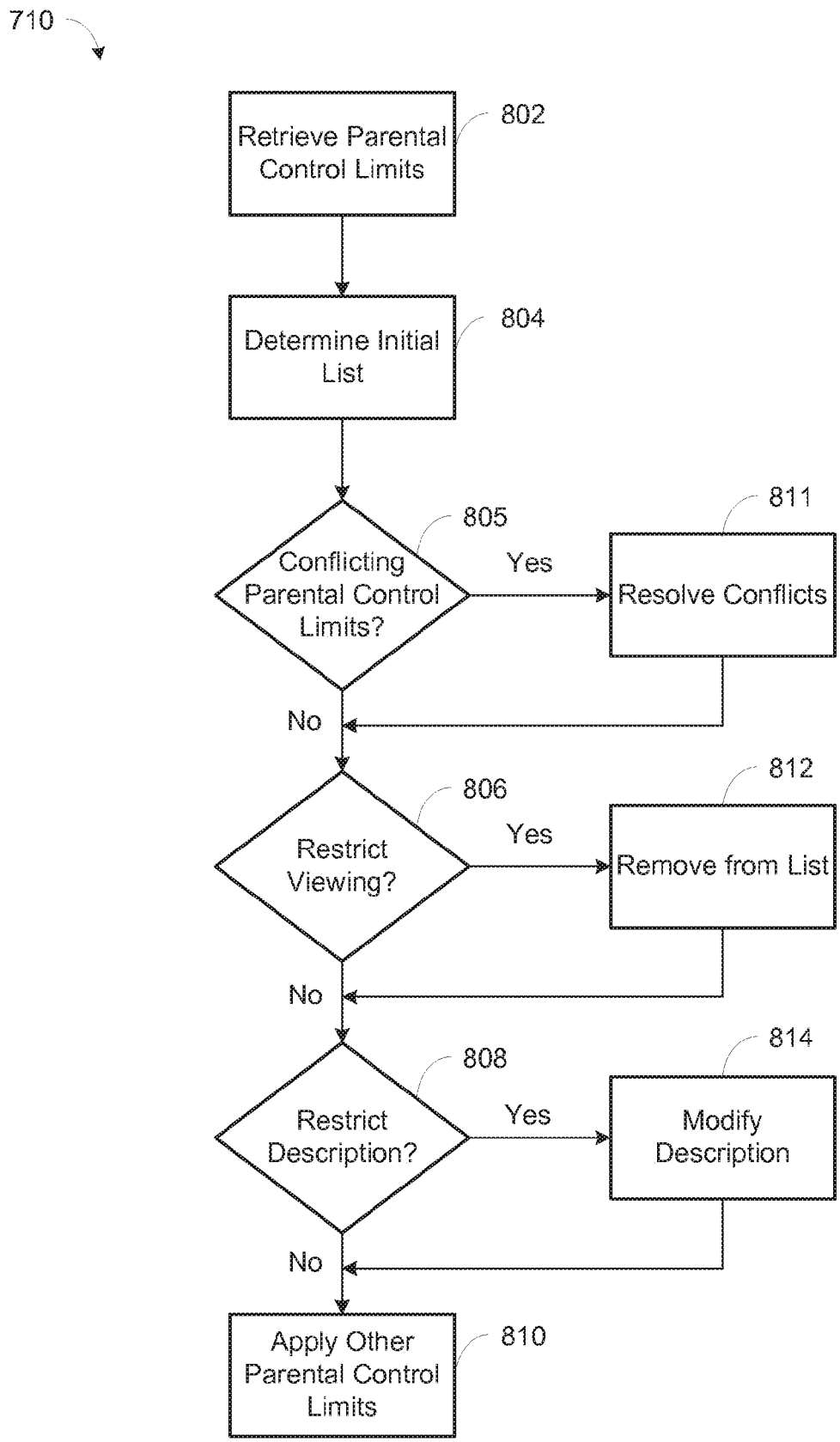
FIG. 8 is a flowchart illustrating operations for utilizing the parental control limits in the customer profile to filter the media content.

At step 710, the media content may be filtered based on the parental control limits in the customer profile. The customer profile may include multiple sets of parental control limits from multiple content providers, as described above. An embodiment of step 710 in the process 700 is shown in FIG. 8. At step 802, parental control limits can be retrieved from the customer profile. As described above, the parental control limits may have been stored in the customer profile at step 708. An initial list of media content may then be determined at step 804. The initial list may include a list of available media articles that are distributable from an article dispensing machine 230. Determining a list of available media articles is discussed in more detail below with reference to FIG. 11. The initial list may also include a list of available media selections from a content provider, where the availability of the media selections is based on an access permission in a customer subscription. Determining a list of available media selections is discussed in more detail below with reference to FIG. 12. The initial list of media content may be determined at step 804 in response to a search request, browsing request, or other request related to finding media content.

At step 805, it is determined whether any of the retrieved parental control limits are in conflict with one another, such as when parental control limits from different content providers are set differently. If there is a conflict, then at step 811, the conflicts may be resolved so that the most restrictive parental control limit takes precedence. The user can also be informed that there are conflicting parental control limits. For example, if the parental control setting from content provider A denotes that R-rated movies are allowed to be viewed, but the parental control setting from content provider B denotes that only PG-13 movies are allowed to be viewed, then the parental control setting from content provider B would take precedence because it is more restrictive. Following step 811, the process 710 continues to step 806. The process 710 also continues to step 806 if there are no parental control limits in conflict at step 805.

At step 806, the parental control limits retrieved at step 802 are examined to determine if any of the parental control limits are related to restricting viewing of media content, such as a television content rating, a film content rating, a video game content rating, a channel lock, a title restriction, an actor restriction, a time of day limitation, or a functionality limitation. If any of the parental control limits are related to restricting viewing of media content at step 806, then the applicable parental control limits can be applied to remove the relevant pieces of media content from the initial list at step 812. For example, if a piece of media content in the initial list, such as a television program, is rated TV-14 and the parental control limits in the customer profile include a television content rating limit that prohibits viewing of media content that is rated TV-14 or TV-MA, then that piece of media content will be removed from the initial list. However, if a piece of media content in the initial list is rated TV-Y, TV-Y7, TV-Y7-FV, TV-G, or TV-PG, then that piece of media content will not be removed from the initial list. As another example, if the parental control limits include a channel lock limit that prohibits viewing of the Showtime cable channel, then any media content in the initial list that are shown on Showtime will be removed. As a further example, if the parental control limits include a title restriction that prohibits viewing media content with a title that matches "Harry Potter", then any media content in the initial list that matches the title restriction will be removed. Following step 812, the process 710 continues to step 808.

The process 710 also continues to step 808 if no parental control limits are related to restricting viewing of media content at step 806. At step 808, it is determined whether any of the parental control limits retrieved at step 802 relates to restricting the description of media content. Such parental control limits include a do not list restriction, a content description restriction, or a metadata display restriction. If any of the parental control limits are related to restricting the description of media content at step 808, then the applicable parental control limits can be applied to modify the pieces of media content from the initial list at step 814. For example, if a parental control limit is a do not list restriction that prohibits the listing of media content that is in the horror genre, then any media content in the initial list that is in the horror genre will be removed at step 814. As another example, if a parental control limit is a metadata display restriction that prohibits viewing of metadata related to adult content, then the description of any media content in the initial list that matches this restriction can be changed so that "Adult Content" is displayed instead of the original description of the media content. The process 710 continues to step 810 following step 814.

The process 710 also continues to step 810 if no parental control limits are related to restricting the description of media content at step 808. At step 810, any other parental control limits that are in the customer profile are applied, such as a time limitation or a purchase limitation. The media content from the initial list that has not been removed at step 812, had its description modified at step 814, or was subject to other parental control limits at step 810, can be included in a filtered list that is transmitted at step 712. The filtered list may be transmitted in place of the initial list. In some embodiments, once authenticated to a content provider, the central controller 302 may periodically query the content provider in order to detect any changes in the parental control limits at that content provider. If a change in the parental control limits is detected, the customer profile in the customer profile database 404 may be updated with the change.

Figure 9:
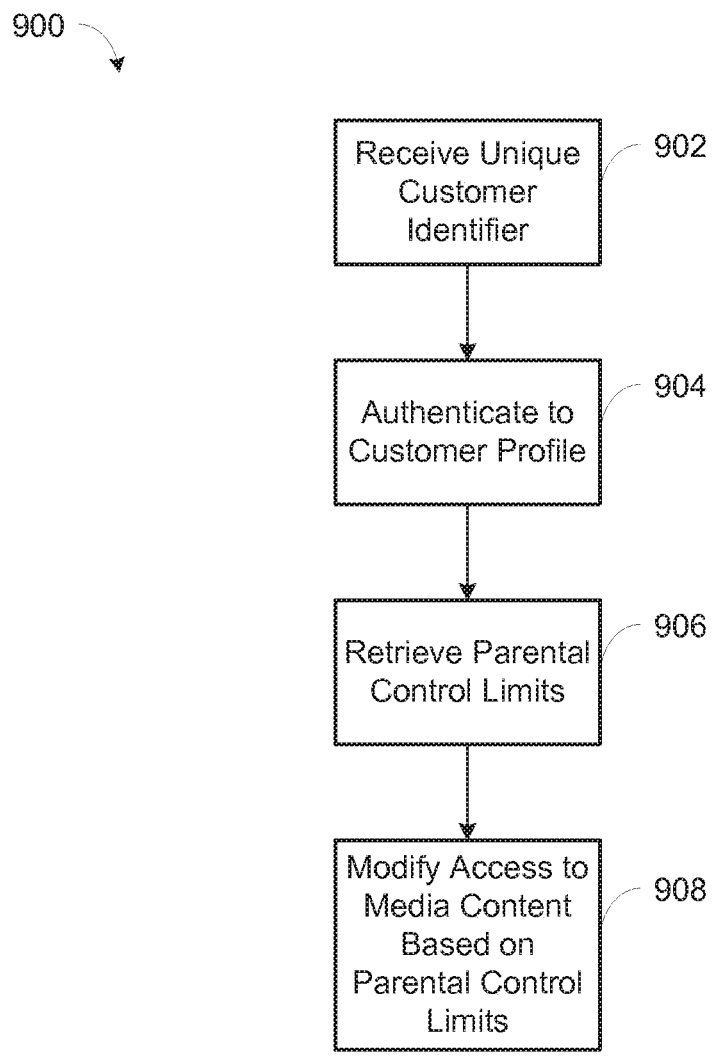
FIG. 9 is a flowchart illustrating operations for modifying access to media content based on parental control limits in a customer profile.

An embodiment of a process 900 for modifying access to media content based on parental control limits in a customer profile stored in the customer profile database 404 is shown in FIG. 9. The process 900 can result in the modification of access to media content, such as physical media articles and digital media selections, based on parental control limits in the customer profile that have previously been retrieved from one or more content providers. As described above, parental control limits may include, but are not limited to, a television content rating, a film content rating, a video game content rating, a channel lock, a title restriction, an actor restriction, a time limitation, a time of day limitation, a functionality limitation, a purchase limitation, a do not list restriction, a content description restriction, or a metadata display restriction.

At step 902, a unique customer identifier may be received by the central controller 302. The central controller 302 can match the unique customer identifier to a particular customer profile in the customer profile database 404. The unique customer identifier could be a credit or debit card number processed through a hash function. The hashed credit or debit card number can be used to look up a customer profile in the customer profile database 404. The unique customer identifier could also be a username and/or password to access the customer profile in the customer profile database 404. The unique customer identifier may be received from an article dispensing machine 230 or an application running on an electronic device 306 or A/V display interface 309.

At step 904, the central controller 302 can authenticate to a customer profile in the customer profile database 404 using the unique customer identifier. The parental control limits in the customer profile may be retrieved at step 906. The parental control limits may have previously been stored in the customer profile by using the process 700 described above, for example. Each set of the parental control limits may correspond to one or more content providers. The parental control limits at the content provider may be specific to the type of media content provided by the content provider.

Figure 10:
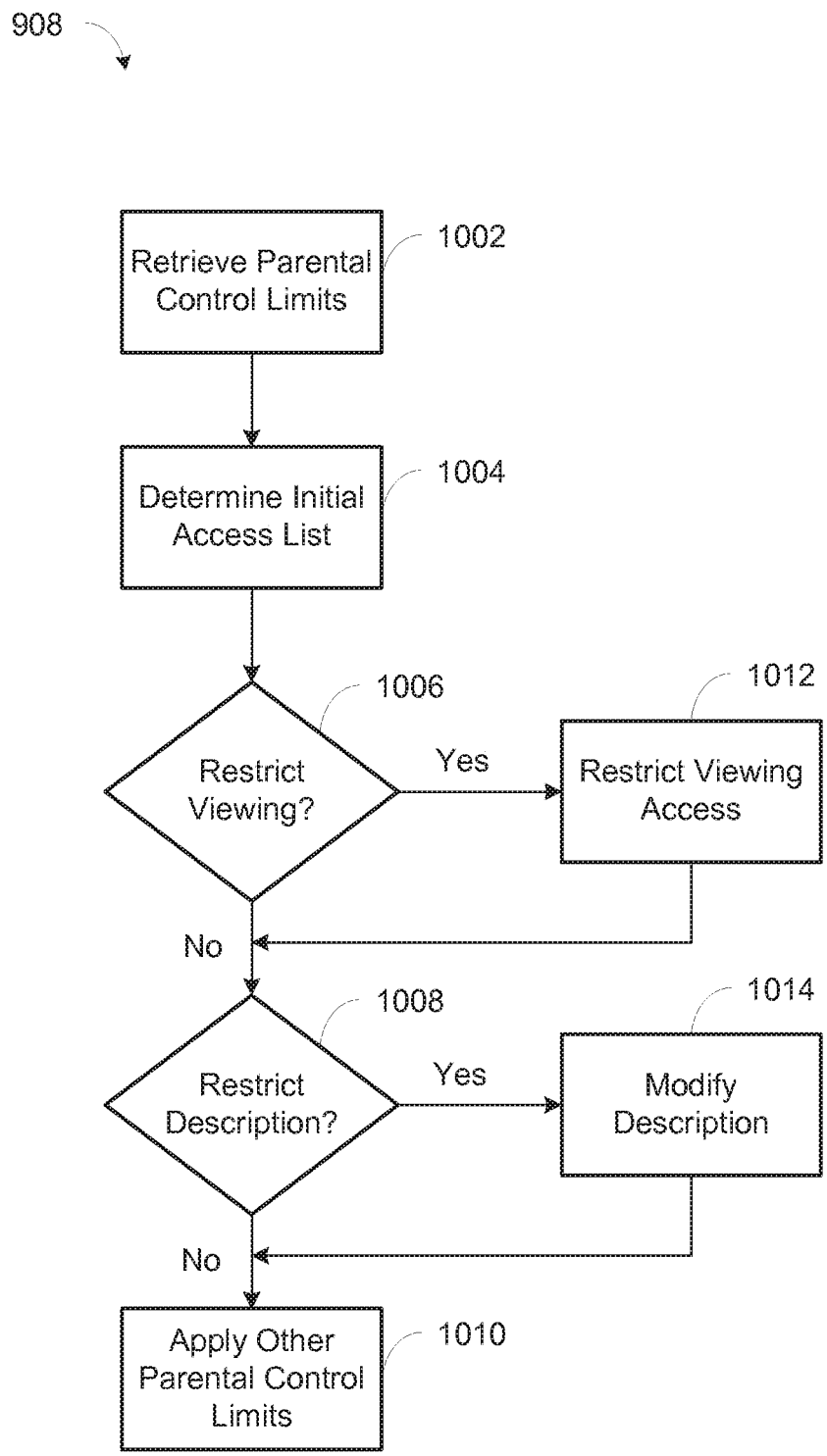
FIG. 10 is a flowchart illustrating operations for utilizing the parental control limits in the customer profile to modify access to the media content.

At step 908, access to the media content may be modified based on the parental control limits in the customer profile. An embodiment of step 908 in the process 900 is shown in FIG. 10. At step 1002, parental control limits can be retrieved from the customer profile. As described above, the customer profile may have been authenticated to with the unique customer identifier at step 904. An initial access list of media content may be determined at step 1004. The initial access list may include a list of available media articles that are distributable from an article dispensing machine 230. Determining a list of available media articles is discussed in more detail below with reference to FIG. 11. The initial access list may also include a list of available media selections from a content provider, where the availability of the media selections is based on an access permission in a customer subscription. Determining a list of available media selections is discussed in more detail below with reference to FIG. 12. The initial access list of media content may be determined at step 1004 in response to a search request, browsing request, or other request related to finding media content.

At step 1006, the parental control limits retrieved at step 1002 are examined to determine if any of the parental control limits are related to restricting viewing of media content, such as a television content rating, a film content rating, a video game content rating, a channel lock, a title restriction, an actor restriction, a time of day limitation, or a functionality limitation. If any of the parental control limits are related to restricting viewing of media content at step 1006, then viewing of the pieces of media content from the initial access list that violate the applicable parental control limits can be restricted at step 1012. For example, if a video game in the initial access list is rated T and the parental control limits in the customer profile include a video game content rating limit that restricts access to video games that is rated T, M, or AO, then access to view or interact with that video game will be modified. The access to the video game could be prohibited or subject to approval by a parent, for example. However, if a video game in the initial access list is rated EC, E, or E10+, then there will be unrestricted access to that video game. As another example, if the parental control limits include an actor restriction that restricts media content starring the actor Charlie Sheen, then access to view any media content in the initial access list that matches the actor restriction will be restricted. Restricting access to media content may include prohibiting all or some access to that particular piece of media content. Following step 1012, the process 908 continues to step 1008.

The process 908 also continues to step 1008 if no parental control limits are related to restricting viewing of media content at step 1006. At step 1008, it is determined whether any of the parental control limits retrieved at step 1002 relate to restricting the description of media content. Such parental control limits include a do not list restriction, a content description restriction, or a metadata display restriction. If any of the parental control limits are related to restricting the description of media content at step 1008, then the pieces of media content from the initial access list that violate the applicable parental control limits can be modified at step 1014. For example, if a parental control limit is a content description restriction that restricts or prohibits listing a description of media content with the keyword "profanity", then the descriptions of the pieces of media content that match that keyword will be modified at step 1014. The process 908 continues to step 1010 following step 1014. The process 908 also continues to step 1010 if no parental control limits are related to restricting the description of media content at step 1008. At step 1010, any other parental control limits that are in the customer profile are applied, such as a time limitation or a purchase limitation.

Figure 11:
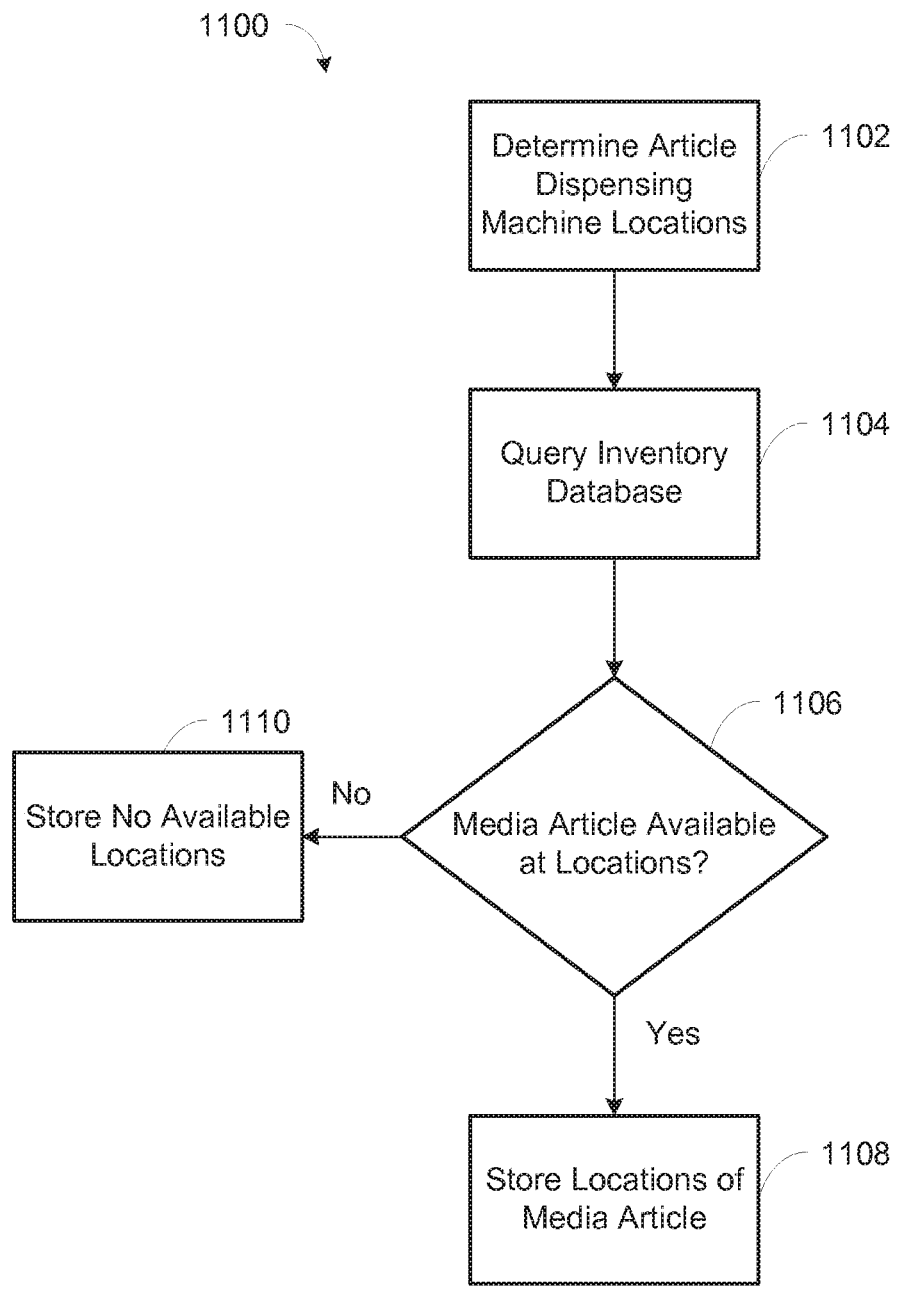
FIG. 11 is a flowchart illustrating operations for determining availability of a media article.

An embodiment of determining availability of physical media articles is shown in the process 1100 of FIG. 11. The process 1100 may be implemented as step 804 of FIG. 8 or step 1004 of FIG. 10 if the media content is a physical media article that may be available at an article dispensing machine 230. The process 1100 may be performed alone or in addition to the process 1200 described below. At step 1102, the location of one or more article dispensing machines 230 can be determined. The location(s) of the article dispensing machines 230 can be determined based on geographic proximity to the location where the customer or user is located, such as based on the address of the customer in the customer profile database 404. The article dispensing machine 230 locations could also be determined based on a location that is manually entered by a user. The locations of the article dispensing machines 230 that are closest to the originating location may then be determined. The locations may be limited by a radius, city, town, zip code, or other limitation. The location of one or more specific article dispensing machines 230 may also be input by a user at step 1102.

At step 1104, the inventory database 412 can be queried to determine whether the media article is available at the locations of the article dispensing machines 230 determined at step 1102. If the media article is available at one or more article dispensing machines 230 at step 1106, then at step 1108, the locations of those article dispensing machines 230 can be stored for use as the initial list determined at step 804 in the process 710, or as the initial access list determined at step 1004 in the process 908. However, if the media articles are not available at any article dispensing machine 230 at step 1106, then no available locations can be stored at step 1110.

Figure 12:
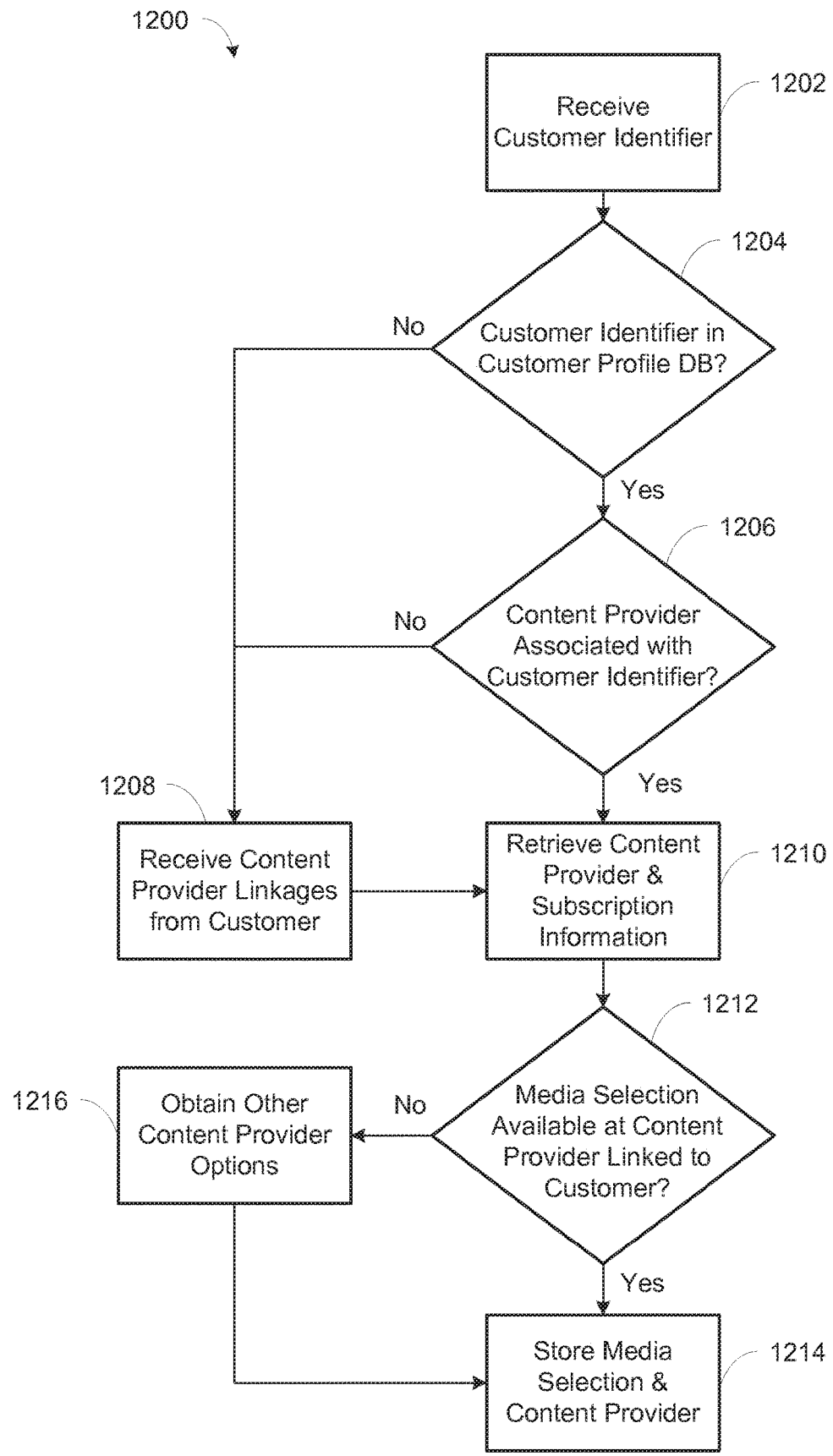
FIG. 12 is a flowchart illustrating operations for determining availability of a media selection.

An embodiment of determining availability of digital media selections is shown in the process 1200 of FIG. 12, including determination of an associated content provider and the availability of the media selections at the associated content provider. The process 1200 may be implemented as step 804 of FIG. 8 or step 1004 of FIG. 10 if the media content is a digital media selection that may be available at a content provider. The process 1200 may be performed alone or in addition to the process 1100 described above. At step 1202, a unique customer identifier may be received by the central controller 302. The central controller 302 can match the unique customer identifier to a particular customer profile in the customer profile database 404. The unique customer identifier could be a credit or debit card number processed through a hash function. The hashed credit or debit card number can be used to look up a customer profile in the customer profile database 404. The unique customer identifier may also include a customer-provided identification of the associated content provider. The customer could also provide what content providers they are associated with, and optionally provide the specific subscription package they subscribe to, instead of providing a credit card number or account number. If step 1202 is being implemented as part of the process 908 (as shown in FIGS. 9 and 10), then step 1202 may be omitted if a unique customer identifier has already been received at step 902. The unique customer identifier could also be a username and/or password to access the customer profile in the customer profile database 404. The unique customer identifier may be received from an article dispensing machine 230 or an application running on an electronic device 306 or A/V display interface 309.

At step 1206, the central controller 302 can determine whether there is an associated content provider linked to the customer profile found at step 1204. The customer profile in the customer profile database 404 may contain a linkage to an associated content provider. If there is not a content provider associated with the customer profile at step 1206 or if no unique customer identifier is found in the customer profile database 404 at step 1204, the customer may provide the linkages of content providers at step 1208. The customer profile in the customer profile database 404 can include information obtained from the content provider customer profile database 502 in the content provider backend 308, such as an account number, email address, subscription information, and other information related to the customer's content provider customer profile.

If there is a content provider associated with the customer identifier at step 1206, the process continues to step 1210 where subscription information at the content provider for the customer is retrieved from the customer profile database 404. The customer profile database 404 may contain subscription and entitlement information that was previously received from the content provider customer profile database 502 in the content provider backend 308. Subscription information at the content provider can include the customer's subscribed service package, premium channel content the customer entitled to access, zip code and address for possible geographical content restrictions, parental authorization and controls for age authentication, and other subscriber information. The subscription information may be used by the central controller 302 at step 1212 when determining the availability of media selections for the customer at particular content providers. Step 1210 is also performed following step 1208 when a customer has entered a linkage to a content provider.

At step 1212, the central controller 302 determines whether the media selections are available at a content provider that is linked to the customer. In addition to determining whether the media selections are available at a linked content provider, the central controller 302 can determine at step 1212 whether the customer has permission to access the media selection based on the subscription information in the customer profile database 404 that was previously obtained at step 1210.

A customer may be entitled to access a digital media selection for free, such as when the media selection is already available within the customer's subscription package, or when the media selection is publicly available. In other cases, a customer may only have access to a media selection by providing additional payment, such as when the customer's subscription package does not allow access to the media selection or when the media selection is only available at an a la carte content provider. For example, if the customer's subscription package allows access to Home Box Office (HBO) content and the media selection is available through HBO, then the customer will have access to the media selection without additional payment. As another example, if the customer's subscription package only allows access to Showtime content and the media selection is only available through HBO, then the customer will not have access to the media selection. In this case, the customer may have the option to upgrade their subscription package to include HBO or utilize an a la carte content provider for an additional payment. As a further example, if the customer is a Comcast subscriber and the media selection is available as a free video-on-demand selection on Comcast, then the customer will have access to the media selection without additional payment. However, if the media selection is only available through Hulu Plus, then the customer will not have access to the media selection unless the customer provides additional payment.

Therefore, if the media selection is available at a linked content provider at step 1212, then at step 1214, the media selections and associated content providers can be stored as the initial list determined at step 804 in the process 710, or as the initial access list determined at step 1004 in the process 908. If the media selection is not available at a linked content provider at step 1212, then the central controller 302 can obtain other content provider options, if any, at step 1216. Other content provider options may include a la carte content providers such as Amazon Instant Video, iTunes Store, YouTube, VUDU, and other services that allow a user to individually purchase media without requiring a subscription. Further content provider options that may be obtained at step 1216 include retailers that grant rights to a digital media selection in conjunction with the purchase of a physical item (e.g., Best Buy, Walmart, etc.), movie studios, television networks, video game developers, and online gaming delivery services (Xbox Live, PlayStation Network, OnLive, etc.). For example, a video game may be available from an online gaming delivery service for download, such as from Xbox Live or the PlayStation Network, or for streaming, such as from OnLive. If other content providers are available for the media selection, the media selection and the associated a la carte content provider(s) may be stored at step 1214.

Any process descriptions or blocks in figures should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

The invention claimed is:

1. A method of accessing media content based on at least one of a plurality of parental control limits in a customer profile, the customer profile stored in a customer profile database connected to a second content provider processor of a second content provider independent from and not affiliated with a first content provider, the method comprising:
   receiving a unique customer identifier at the second content provider processor of the second content provider for accessing a first parental control limit stored in a second customer profile within a second customer profile database within a second memory associated with the second content provider processor; wherein the first parental control limit was previously imported from a first memory associated with a first content provider processor for the first content provider;
   authenticating to the second customer profile based on the unique customer identifier;
   retrieving the first parental control limit from the second customer profile, wherein the first parental control limit was imported from the first content provider and generated at the first content provider by a customer associated with the first and second customer profiles prior to being imported; and,
   filtering the media content based on the first parental control limit stored within the second customer profile to produce a filtered list of the media content; and,
   modifying access to the media content based on the first parental control limit, comprising:
      retrieving the first parental control limit from the second customer profile; and
      determining an initial access list of the media content, wherein the initial access list comprises the media content prior to application of the first parental control limit; and restricting access to the media content on the initial access list that is restricted by the first parental control limit, comprising modifying a description of the media content, if the first parental control limit restricts viewing the description of the media content.

2. The method of claim 1, wherein each of the plurality of the first parental control limits comprises one or more of a television content rating, a film content rating, a video game content rating, a channel lock, a title restriction, an actor restriction, a time limitation, a time of day limitation, a functionality limitation, a purchase limitation, a do not list restriction, a content description restriction, or a metadata display restriction.

3. The method of claim 1, further comprising:
   receiving authentication information for each of a plurality of content providers;
   authenticating to each of the plurality of content providers based on the received authentication information;
   receiving a plurality of parental control limits from each of the plurality of content providers; and
   storing the plurality of parental control limits received from each of the plurality of content providers in the second customer profile.

4. The method of claim 1, wherein restricting access of the media content on the initial access list comprises restricting viewing of the media content, if the first parental control limits restricts viewing of the media content.

5. The method of claim 1, wherein:
   the media content comprises a media article distributable from an article dispensing machine, wherein the media article comprises at least one of a digital video disc, a Blu-ray disc, or a video game; and
   determining the initial access list comprises querying an inventory database for availability of the media article at the article dispensing machine, the inventory database connected to the processor.

6. The method of claim 1, wherein:
   the media content comprises a media selection at the first content provider, wherein the media selection comprises at least one of a video on demand, a streaming video, a downloadable video, a streaming video game, or a downloadable video game; and
   determining the initial access list comprises determining an availability of the media selection based on an access permission for the media selection in a customer subscription for one of the plurality of the first content providers.

7. The method of claim 1, further comprising receiving the unique customer identifier from one or more of an article dispensing machine, an electronic device, and an A/V display interface.

8. The method of claim 1, further comprising:
   detecting a change in any of the plurality of parental control limits at the first content provider; and,
   updating the plurality of parental control limits in the customer profile with the detected change in any of the plurality of parental control limits.

9. A system for interfacing with a first content provider processor and memory associated with a first content provider, and for accessing media content based on at least one of a plurality of parental control limits, comprising:
   a second content provider processor and memory associated with a second content provider, wherein a second customer profile is stored in a customer profile database within the second content provider memory connected to the second content provider processor of the second content provider independent from and not affiliated with a first content provider, wherein computer program code stored in the second content provider memory is configured to:
receive a unique customer identifier for accessing a first parental control limit stored in the second customer profile within the second customer profile database within the second memory associated with the second content provider processor; wherein the first parental control limit was previously imported from the first content provider memory associated with the first content provider processor for the first content provider;
authenticate to the second customer profile based on the unique customer identifier;
retrieve the first parental control limit from the second customer profile, wherein the first parental control limit was imported from the first content provider and generated at the first content provider by a customer associated with the first and second customer profiles prior to being imported; and,
filter the media content based on the first parental control limit stored within the second customer profile to produce a filtered list of the media content; and,
modify access to the media content based on the first parental control limit, further configured to:
retrieve the first parental control limit from the second customer profile;
determine an initial access list of the media content, wherein the initial access list comprises the media content prior to application of the first parental control limit; and restrict access to the media content on the initial access list that is restricted by the first parental control limit, further configured to modify a description of the media content if the first parental control limit restricts viewing the description of the media content.

10. The system of claim 9, wherein each of the plurality of the first parental control limits comprises one or more of a television content rating, a film content rating, a video game content rating, a channel lock, a title restriction, an actor restriction, a time limitation, a time of day limitation, a functionality limitation, a purchase limitation, a do not list restriction, a content description restriction, or a metadata display restriction.

11. The system of claim 9, wherein the computer program code stored in the second content provider memory is further configured to:
receive authentication information for each of a plurality of content providers;
authenticate to each of the plurality of content providers based on the received authentication information;
receive a plurality of parental control limits from each of the plurality of content providers; and
store the plurality of parental control limits received from each of the plurality of content providers in the second customer profile.

12. The system of claim 9, wherein the computer program code which restricts access of the media content on the initial access list is further configured to:
restrict viewing of the media content, if the first parental control limits restricts viewing of the media content.

13. The system of claim 9, wherein the media content comprises a media article distributable from an article dispensing machine, wherein the media article comprises at least one of a digital video disc, a Blu-ray disc, or a video game; and wherein the computer program code which determines the initial access list is further configured to:
query an inventory database for availability of the media article at the article dispensing machine, the inventory database connected to the second content provider processor.

14. The system of claim 9, wherein the media content comprises a media selection at the first content provider, wherein the media selection comprises at least one of a video on demand, a streaming video, a downloadable video, a streaming video game, or a downloadable video game; and wherein the computer program code which determines the initial access list is further configured to:
determine an availability of the media selection based on an access permission for the media selection in a customer subscription for one of the plurality of the first content providers.

15. The system of claim 9, wherein the computer program code stored in the second content provider memory is further configured to receive the unique customer identifier from one or more of an article dispensing machine, an electronic device, and an A/V display interface.

16. The system of claim 9, wherein computer program code stored in the second content provider memory is further configured to:
receive a detection of a change in any of the plurality of parental control limits at the first content provider; and,
update the plurality of parental control limits in the customer profile with the detected change in any of the plurality of parental control limits.

* * * * *